US006873904B2

(12) United States Patent
Yamamoto et al.

(10) Patent No.: US 6,873,904 B2
(45) Date of Patent: Mar. 29, 2005

(54) DRIVER ASSIST INFORMATION TRANSMITTER, A DRIVER ASSIST INFORMATION RECEIVER, AND A DRIVER ASSIST INFORMATION PROVIDING SYSTEM

(75) Inventors: Tetsuo Yamamoto, Tokyo (JP); Akira Yamada, Aichi (JP); Yasuhiro Nishigori, Kanagawa (JP)

(73) Assignee: Vehicle Information and Communication System Center, Tokyo (JP)

( * ) Notice: Subject to any disclaimer, the term of this patent is extended or adjusted under 35 U.S.C. 154(b) by 38 days.

(21) Appl. No.: 10/413,069

(22) Filed: Apr. 14, 2003

(65) Prior Publication Data

US 2003/0204306 A1 Oct. 30, 2003

(30) Foreign Application Priority Data

Apr. 24, 2002 (JP) ....................................... 2002-121759
Mar. 20, 2003 (JP) ....................................... 2003-077516

(51) Int. Cl.[7] ................................................ G01C 21/26
(52) U.S. Cl. ....................................... 701/200; 701/207
(58) Field of Search ................................ 701/200, 211, 701/24, 28; 342/357.09, 357.1

(56) References Cited

U.S. PATENT DOCUMENTS 5,864,305 A 1/1999 Rosenquist
2004/0075606 A1 * 4/2004 Laiho et al. ............. 342/357.1

FOREIGN PATENT DOCUMENTS

| | | | |
|---|---|---|---|
| DE | 101 37 606 A | 2/2002 |
| EP | 0 883 257 A | 12/1998 |
| JP | 2000-076587 | 3/2000 |
| WO | WO 99/09374 | 2/1999 |

* cited by examiner

*Primary Examiner*—Yonel Beaulieu
(74) *Attorney, Agent, or Firm*—Carrier, Blackman & Associates, P.C.; Joseph P. Carrier; William D. Blackman

(57) ABSTRACT

A driver assist information providing system includes a driver assist information transmitter and a driver assist information receiver. In the driver assist information transmitter, driver assist information having positional information and multimedia information are generated to each element of real time information by a driver assist information generator. After coding and compacting by a coded data compactor, an event constructed by an event module constitutor is broadcasted by a transmitter as a modulated event. In the driver assist information receiver, the driver assist information is obtained through the demodulation by an event module demodulator and decompression and decoding by a driver assist information obtainer. Then, the driver assist information to be required is selected by the driver assist information obtainer using positional information obtained by a current position obtainer, and is indicated on a display device.

9 Claims, 22 Drawing Sheets

FIG.4

| POSSITIONAL INFORMATION | TRAFFIC CONGESTION INFORMATION | ADDITIONAL INFORMATION (MULTIMEDIA INFORMATION) |
|---|---|---|
| AREA-ID, LINK-ID, GRID COODINATE | DEGREE OF THE TRAFFIC CONGESTION | TEXT, GRAPHIC, IMAGE, VOICE |

FIG.5

| POSSITIONAL INFORMATION | INCIDENT / TRAFFIC REGULATION INFORMATION | | ADDITIONAL INFORMATION (MULTIMEDIA INFORMATION) |
|---|---|---|---|
| | DETAIL INFORMATION | TIME INFORMATION | |
| AREA-ID, LINK-ID, GRID COODINATE | CONTENTS OF EVENT<br>CONTENTS OF REGULATION<br>PERIOD OF REGULATION<br>MARK<br>START POINT, END POINT | TIME PERIOD, TIME ZONE | TEXT, GRAPHIC, IMAGE, VOICE |

REAL TIME INFORMATION

MULTIMEDIA INFORMATION

FIG.6

| POSITIONAL INFORMATION | PARKING / REST AREA INFORMATION | | | | | ADDITIONAL INFORMATION (MULTIMEDIA INFORMATION) |
|---|---|---|---|---|---|---|
| | COMPLEMENTARY POSITIONAL INFORMATION | APPELLATION INFORMATION | PARKING CONGESTION INFORMATION | REST AREA CONGESTION INFORMATION | FACILITY INFORMATION | |
| AREA-ID, LINK-ID GRID COORDINATE OF PARKING | ADDRESS<br>POSTAL CODE<br>PHONE NUMBER | NAME | CONGESTION STATE<br>VACANT RATE OF PARKING<br>WAITING TIME | CONGENSTION STATE OF SMALL CAR PARKING<br>CONGESTION STATE OF LARGE CAR PARKING<br>VACANT RATE OF SMALL CAR PARKING<br>VACANT RATE OF LARGE CAR PARKING | PRIVILEGES INFORMATION SUCH AS DISCOUNT<br>OPENING HOUR<br>CAPACITY<br>RESTRICTION | TEXT, GRAPHIC IMAGE, VOICE |

FIG. 7

| POSITIONAL INFORMATION | TRAVEL TIME INFORMATION | | ADDITIONAL INFORMATION (MULTIMEDIA INFORMATION) |
|---|---|---|---|
| | SECTION TRAVEL TIME INFORMATION | LINK TRAVEL TIME INFORMATION | |
| AREA-ID, LINK-ID, GRID COODINATE | APPROXIMATE TIME TO BE REQUIRED | APPROXIMATE TIME TO BE REQUIRED | TEXT, GRAPHIC, IMAGE, VOICE |

FIG.8

| POSITIONAL INFORMATION | WEATHER CONDITION INFORMATION | ADDITIONAL INFORMATION (MULTIMEDIA INFORMATION) |
| --- | --- | --- |
| AREA-ID | WEATHER CONDITION | WEATHER SYBMOL<br>WEATHER-CHART |

FIG. 9

| POSITIONAL INFORMATION | TRAFFIC CONGESTION INFORMATION | ADDITIONAL INFORMATION (MULTIMEDIA INFORMATION) |
|---|---|---|
| LINK-ID = 100 | LEVEL3 : CONGESTING | TEXT MESSAGE : SPONTANEOUS TRAFFIC CONGESTION. IT WILL BE CLEARED BY 10 P.M. |

FIG. 10

```
<congestion-info>
    <congestion no="1"version="0" expire="10:55">
            <location>
                    <line><link-id type="intercity-highway">100</link-id></line>
            </location>
            <state>traffic congestion</state>
            <info><text>Spontaneous traffic congestion.  It will be cleared by 10 p.m </test></info>
    </congestion>
</congestion-info>
```

FIG. 11

| POSITIONAL INFORMATION | INCIDENT / TRAFFIC REGULATION INFORMATION | | |
|---|---|---|---|
| | CONTENTS OF INCIDENT / TRAFFIC REGULATION | TIME INFORMATION | ADDITIONAL INFORMATION |
| LINK-ID = 830 | ROAD CLOSURE<br>TRAFFIC ACCIDENT | 1HOUR | TEXT MESSAGE :<br>Road closure by Traffic accident. it takes one hour.<br>SYMBOL CODE : 7a21<br>IMAGE FILE NAME : m2346.mpg<br>VOICE FILE NAME : m2346.wav<br>GRAOHIC FILE NAME : m2346.jpg |

FIG. 12

```
<event-info>
    <event no="1"version="0"expire="09:00">
        <location>
            <line name="Route 246">
                <link-id name="Aoyama 2-chome">830</link-id>
            </line>
        </location>
        <cause>traffic accident</cause>
        <regulation distance="1000m">road closure</regulation>
        <info>
                <text>Road closure by Traffic accident
                It takes about one hour for recovery
                </text>
                <mark-code>7a21</mark-code>
                <video src="m2346.mpg"/>
                <audio src="m2346.wav"/>
                <image src="m2346.jpg"/>
        </info>
    </event>
```

DRIVER ASSIST INFORMATION TRANSMITTER, A DRIVER ASSIST INFORMATION RECEIVER, AND A DRIVER ASSIST INFORMATION PROVIDING SYSTEM

BACKGROUND OF THE INVENTION

1. Field of the Invention

The present invention relates to a driver assist information transmitter, a driver assist information receiver, and a driver assist information providing system.

2. Description of Relevant Art

A driver assist information to be typified by traffic information is provided to drivers driving his or her vehicle in diverse ways, such as television broadcast, radio broadcast, the indication on an electric bulletin board, and so on.

When the driver assist information is provided to a driver by means of radio broadcast, the following two communication techniques are generally used. One is the technique, in which the driver assist information is provided by means of AM radio broadcast or FM radio broadcast. The other is the technique, in which the driver assist information is provided as text information by means of FM multiple broadcasts.

As an example of such techniques, the technique disclosed in the Japanese unexamined patent application No. 2000-76587 is known.

In this application, a wireless communication technique is used in order to transmit the driver assist information to each driver (occupant) of a vehicle. In this application, still more concretely, the driver assist information is transmitted to a driver by means of the wireless communication between the mobile station and the wireless communication device to be provided on road.

When the driver assist information is transmitted using the radio broadcast technique, since bandwidth is narrow and the transmission rate is slow, this radio broadcast technique is unfit for the transmission of large amount of data. Thus, the amount of the information of the driver assist information to be supplied to a driver has a limitation.

When the driver assist information is transmitted using the wireless communication technique, on the other hand, the mobile station must pass through the area, wherein communication with the wireless communication device is possible, in order to obtain the driver assist information. Thus, if the contents of the driver assist information are the information, which changes frequently, such as traffic congestion information, a large number of the wireless communication devices are required so that the mobile station can obtain the driver assist information irrespective of the current position. In this case, since large economical burdens are required to provide a large number of the wireless communication devices, the realization has been difficult.

Therefore, the system, which can assist a driver of a mobile station, and which can provide up-to-date information to a driver of a mobile station irrespective of the current position of the mobile station and without limitation of the amount of data, has been required. That is, a driver assist information transmitter, a driver assist information receiver, and a driver assist information providing system, which can fulfill these requirements, have been desired.

SUMMARY OF THE INVENTION

The present invention relates to a driver assist information providing system, which assists an occupant of a mobile station by supplying the driver assist information to an occupant of a mobile station.

This system includes a driver assist information transmitter and a driver assist information receiver.

The driver assist information transmitter has a driver assist information generator, a coded data compactor, an event module constitutor, and a transmitter.

The driver assist information receiver has an event demodulator, a driver assist information obtainer, a current position obtainer, a driver assist information arranger, a display device, and a controller.

The driver assist information generator of the driver assist information transmitter performs a readout of real time information and multimedia information from an information recording media, and generates driver assist information to each element of real time information. Here, driver assist information has real time information, which is the information to be updated at frequent intervals, such as traffic congestion information, multimedia information, which includes at least one of image data (information), audio data (information), graphic data (information), and text data (information), and positional information, which indicates the position of the element of real time information.

The coded data compactor of the driver assist information transmitter performs the coding of the driver assist information using a specific description language, such as XML, in order to obtain coded driver assist information, and then performs the compaction of coded driver assist information in order to obtain compacted coded driver assist information.

The event module constitutor of the driver assist information transmitter generates a frame from an information part of coded compacted driver assist information, and constitutes a module by classifying every frame based on positional information, and then organizes an event, which is obtained by collecting all modules generated at the same time.

The transmitter of the driver assist information transmitter performs a modulation of the event in order to obtain a modulated event, and broadcasts the modulated event repeatedly at a suitable cycle.

The driver assist information receiver receives a modulated event broadcasted from the driver assist information transmitter, and obtains driver assist information included in the modulated event based on the current position of a mobile station.

The driver assist information receiver has an event demodulator, a driver assist information obtainer, a current position obtainer, a driver assist information arranger, a display device, and a controller.

The event demodulator of the driver assist information receiver performs a demodulation of the modulated event, which is received by means of a receiver, in order to obtain the event.

The driver assist information obtainer of the driver assist information receiver performs decompression on each frame in the module, which is included in the event, and then performs decoding in order to obtain driver assist information.

The current position obtainer of the driver assist information receiver acquires positional information indicating the current position of the mobile station equipped with the driver assist information receiver.

The driver assist information arranger of the driver assist information receiver selects driver assist information to be required by the occupant of the mobile station among driver assist information, which is obtained in the driver assist information obtainer, based on the positional information acquired by the current position obtainer.

The display device of the driver assist information receiver indicates driver assist information selected by the driver assist information arranger on the Map, which is displayed on the display device.

The controller of the driver assist information receiver inputs the setting condition of driver assist information in order to change the indication manner of the Map.

BRIEF DESCRIPTION OF THE DRAWINGS

FIG. 4 is the explanatory view showing the construction of driver assist information generated by the driver assist information generator when the informational category of real time information is traffic information and the detailed category of traffic information is traffic congestion information.

FIG. 5 is the explanatory view showing the construction of driver assist information generated by the driver assist information generator when the informational category of real time information is traffic information and the detailed category of traffic information is incident/traffic regulation information.

FIG. 6 is the explanatory view showing the construction of driver assist information generated by the driver assist information generator when the informational category of real time information is traffic information and the detailed category of traffic information is parking/rest area information.

FIG. 7 is the explanatory view showing the construction of driver assist information generated by the driver assist information generator when the informational category of real time information is traffic information and the detailed category of traffic information is travel time information.

FIG. 8 is the explanatory view showing the construction of driver assist information generated by the driver assist information generator when the informational category of real time information is weather condition information.

FIG. 9 is an explanatory view showing the concrete contents of traffic congestion information.

FIG. 10 is an explanatory view showing the XML description obtained by the XML-coding of traffic congestion information shown in FIG. 9.

FIG. 11 is an explanatory view showing the concrete contents of incident/regulation information.

FIG. 12 is an explanatory view showing the XML description obtained by the XML-coding of event/congestion information shown in FIG. 11.

DETAILED DESCRIPTION OF THE PREFERRED EMBODIMENTS

The preferred embodiments of the present invention will now be explained with reference to the attached drawings.

In the present invention, the driver assist information transmitter side of the driver assist information providing system is the apparatus, which generates driver assist information and broadcasts the driver assist information. Each driver assist information is mainly composed of real time information and multimedia information.

Real time information is the information to be updated at short interval, such as traffic information, weather condition information, and touristic information.

Multimedia information is the complementary information, such as an image data, an audio data, graphic data, and a text data, and is added to real time information.

The driver assist information receiver side of the driver assist information providing system is the apparatus, which receives driver assist information broadcasted by the driver assist information transmitter side. This apparatus selects the information, which will be required by the occupant of the mobile station, from the received driver assist information, and provides the selected information to the occupant whenever it is required.

Driver Assist Information Providing System

Figure 1:
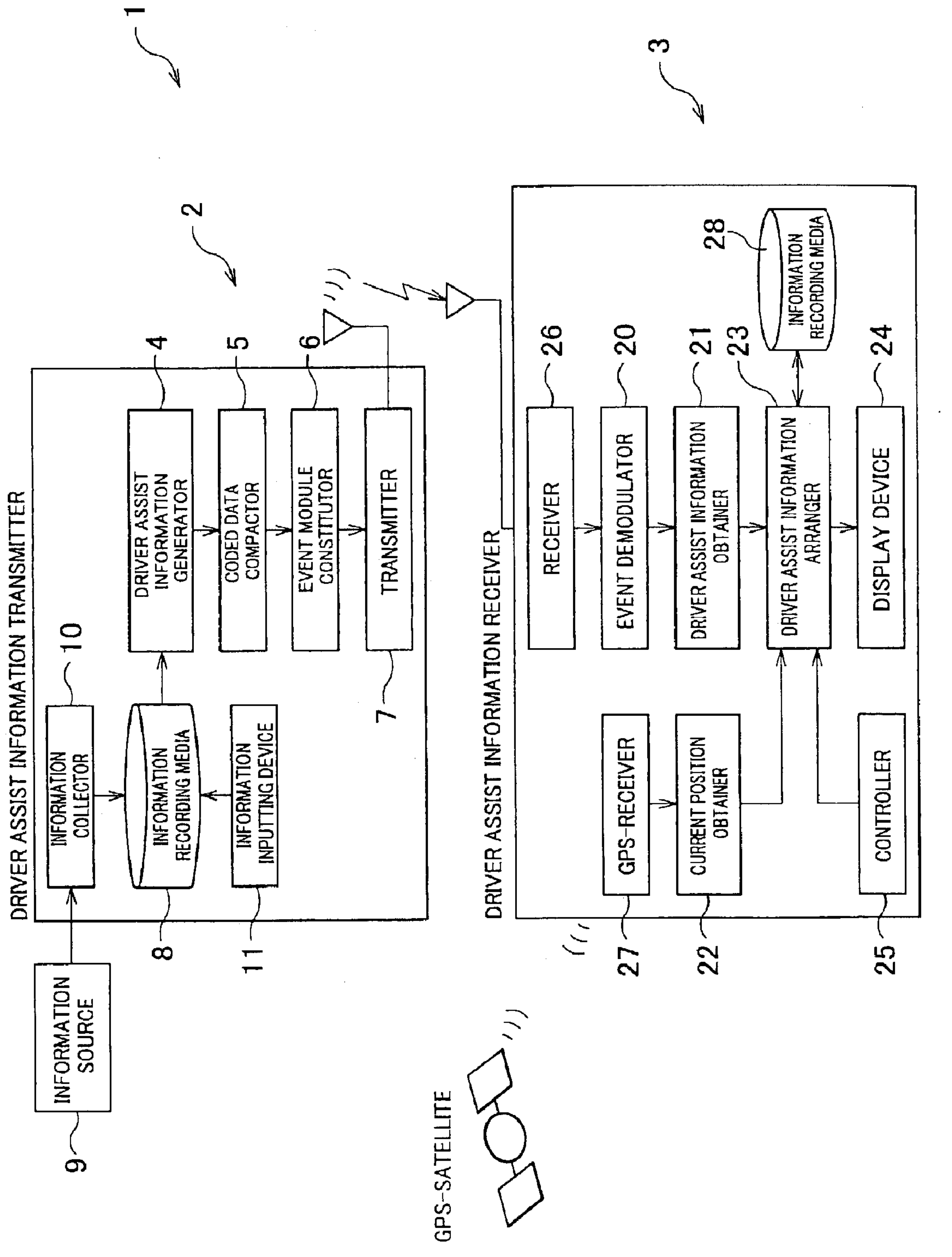
FIG. 1 is an explanatory view showing the system configuration of the driver assist information providing system according to the present invention.

As shown in FIG. 1, a driver assist information providing system 1 according to the present invention has a driver assist information transmitter 2 and a driver assist information receiver 3.

The driver assist information transmitter 2 generates the driver assist information, which assists an occupant of the mobile station, and broadcasts the generated driver assist information. Here, the occupant means all the occupants of the mobile station, such as a driver and a passenger.

The driver assist information receiver 3 is equipped in the mobile station, such as a vehicle, and receives driver assist information, which is transmitted from the driver assist information transmitter 2. The driver assist information receiver 3 selects helpful information for the occupant from the received driver assist information according to the positional information (location reference information) indicating the current position of the mobile station. The information selected from the driver assist information is then provided to the occupant of the mobile station.

Next, The driver assist information transmitter 2 and the driver assist information receiver 3 will be explained.

The Driver Assist Information Transmitter

The driver assist information transmitter 2 has a driver assist information generator 4, a coded data compactor 5, an event module constitutor 6, and a transmitter 7.

The driver assist information generator 4 obtains real time information and multimedia information to be added to real time information as the complementary information, and generates driver assist information from the obtained real time information and the obtained multimedia information.

In the present embodiment, both real time information and multimedia information are stored in the information recording media 8.

Each of real time information to be stored in this information recording media 8 is the information to be updated at frequent intervals. This real time information is prepared by organizing the information, which is supplied from various information sources 9, such as the local police, the road administrator, and various sensors on the road.

The informational contents of real time information are updated by an information collector 10. These informational contents are updated at predetermined cycle, e.g. every 5 minutes, based on the information, which is supplied from various information sources 9.

Each of multimedia information stored in the information recording media 8 is also prepared by organizing the information, which is supplied from various information sources 9. In the present invention, since the frequency of the update of multimedia information is fewer than that of real time information, each of the informational content of multimedia information is updated by the administrator in a manual input by means of an information inputting device 11.

Figure 2:
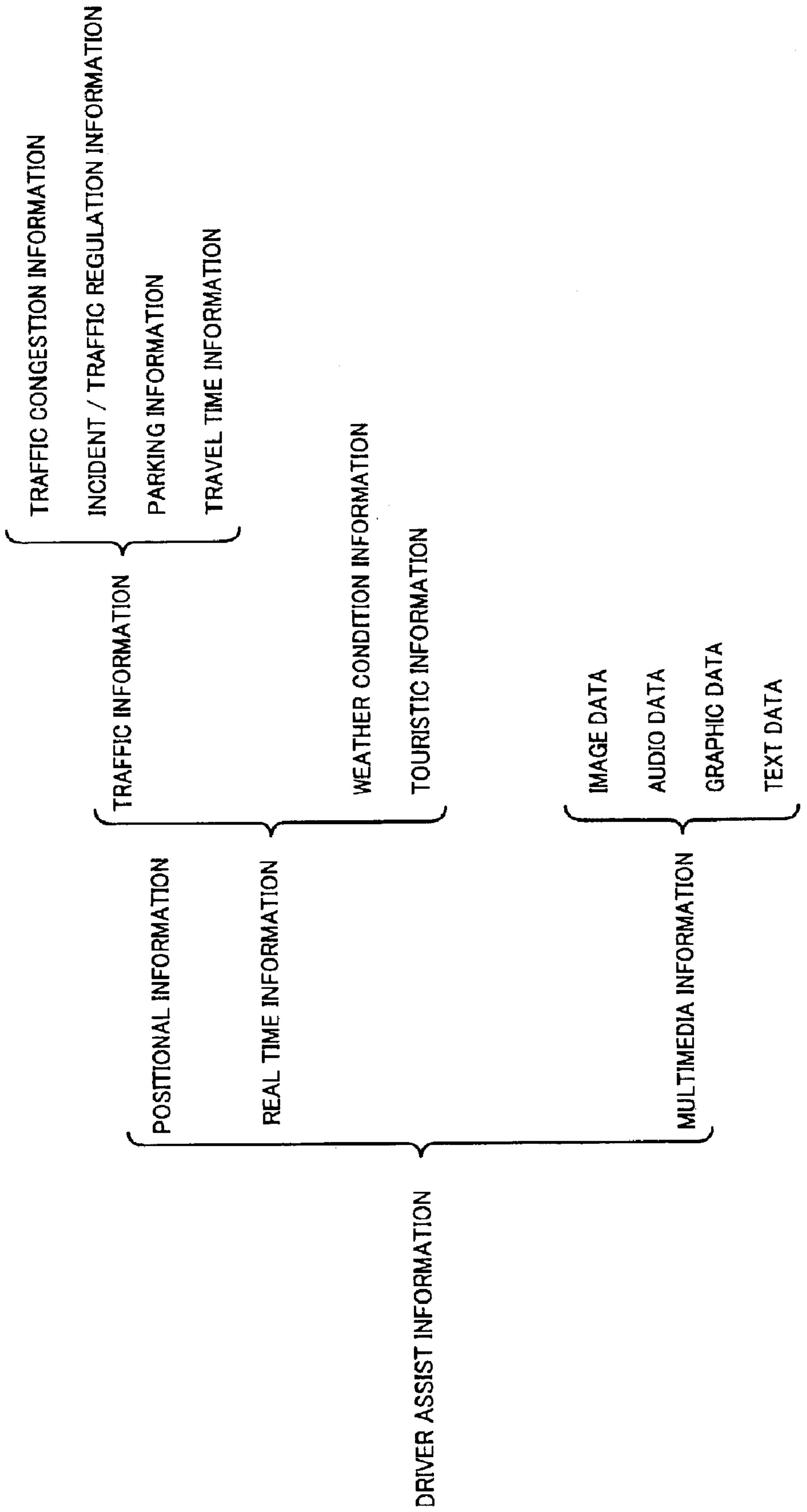
FIG. 2 is an explanatory view showing the construction of driver assist information.

As shown in FIG. 2, each of real time information to be loaded by the driver assist information generator 4 contains at least one of traffic information, weather condition information, and touristic information.

Traffic information is the information to be updated at high frequency, such as traffic congestion information, incident/traffic regulation information, parking information, and travel time information.

Figure 3A:
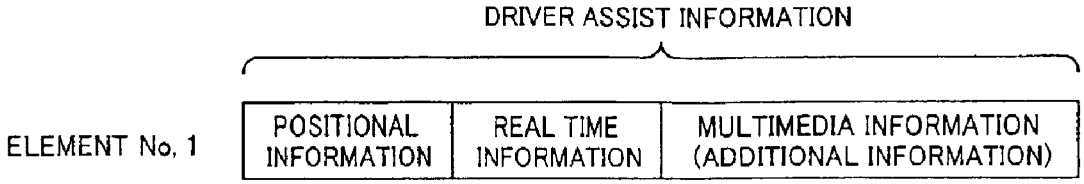
FIG. 3A is an explanatory view showing the construction of driver assist information generated by the driver assist information generator.
Figure 3B:
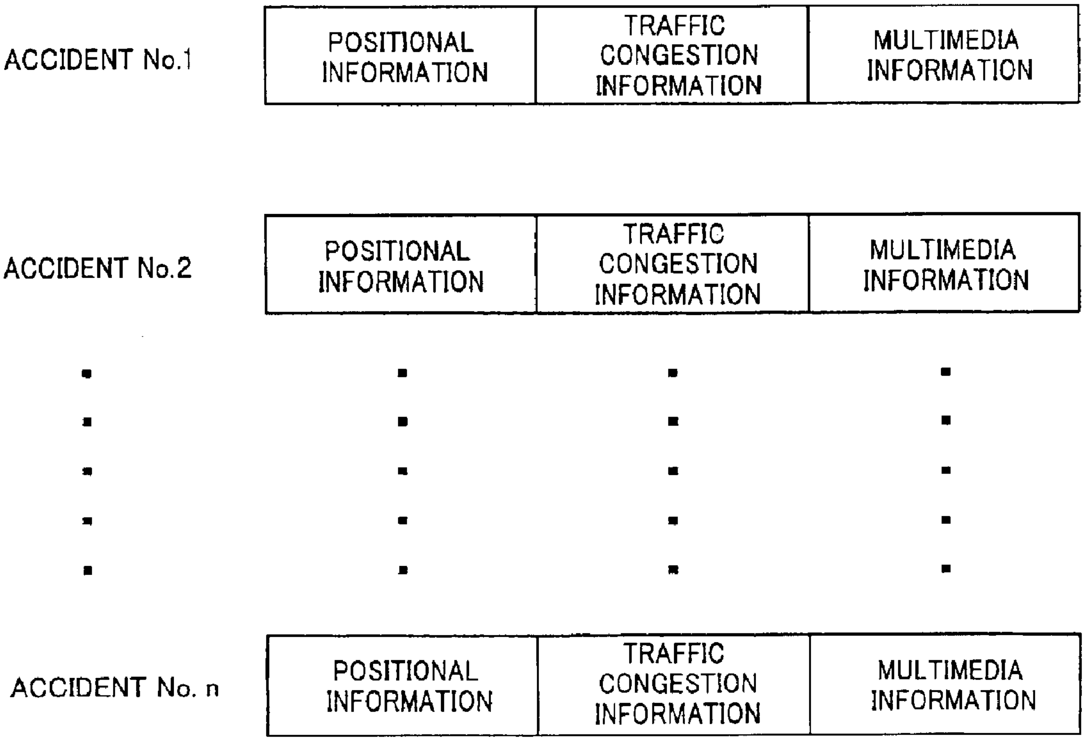
FIG. 3B is an explanatory view showing the construction of driver assist information generated by the driver assist information generator.

As shown in FIG. 3A, the driver assist information generator 4 generates driver assist information, each of which is composed of positional information, real time information, and multimedia information.

Positional information is the information, which indicates the current position of real time information. Multimedia information is the relevant information with regard to real time information.

In the present invention, the positional information and the multimedia information are added to real time information by the driver assist information generator 4 in order to generate the driver assist information. Thereby, each driver assist information is generated to each element of real time information one by one. In other words, one driver assist information is generated to one element of real time information.

When the informational category of real time information is traffic congestion information and the informational content (element) of traffic congestion information is the accident No. 1, the driver assist information generator 4 adds positional information and multimedia information to the informational content of accident No. 1. Here, the accident No. 1 is one of elements among the event of Accident.

Multimedia information is at least one of specific graphic (icon), an image, and a voice, which indicates the event of Accident. In this case, the voice is the voice message, such as message of "it is an accident".

Accordingly, each element of real time information has positional information and multimedia information (additional information). If there are ten elements in real time information, ten driver assist information are generated by the driver assist information generator 4.

As described above, real time information has at least one of traffic information, weather condition information, touristic information. Traffic information contains traffic congestion information, incident/traffic regulation information, parking information, and travel time information. Driver assist information is obtained by adding both of positional information and additional information to each element of real time information.

Next, the detail of driver assist information generated by the driver assist information generator 4 will be explained.

Traffic Congestion Information

As shown in FIG. 4, traffic congestion information generated by the driver assist information generator 4 has positional information, congestion degree information, and additional information (multimedia information). Herein, traffic congestion information and additional information are the concrete informational content to be supplied to the occupant of the mobile station.

Positional information indicates the position where the traffic congestion is occurring. This position is indicated by an area ID, a link ID, and a coordinate in the grid (grid coordinate).

The area ID is a unique identification number assigned to each of the regions, which is an area having predetermined dimensions on a map. In the present embodiment, the number allocated to each region of second mesh is used as this unique identification number. Hereinafter the region of second mesh is defined as the secondary mesh division.

The secondary mesh division is obtained by dividing a first mesh region into eight equal parts in the longitude and latitude direction. Here, the secondary mesh division is equivalent to a map with scale of 1 to 25,000, and the first mesh region is equivalent to that of 1 to 200,000.

Whereby, the rough position of the traffic congestion, such as some position in the second mesh region, can be obtained, when each positional information is indicated by the area ID.

The range of the secondary mesh division, however, is not limited to the map with scale of 1 to 25,000. For example, the secondary mesh division can be established at the narrower range in case of the overcrowded area like an urban area, and the secondary mesh division can be established at the wider range in case of the vacant area like a village area.

The link ID is a unique identification number assigned to each section of a road, such as the section from one intersection to another intersection of the road. In the present embodiment, this Link ID corresponds to a link ID of the VICS-link, which is widely spread in Japan.

To be more precise, the link ID is an identification number assigned to the predetermined section of the road, for example, the section from the point A to the point B of a road is defined as the link ID=1, and the section from the point B to the point C of a road is defined as the link ID=2.

Therefore, when each of multiple positional informations is indicated by the link ID, the comparatively detailed position of the traffic congestion, can be obtained, such as some position in the section of a road.

The coordinate in the grid is a coordinate (x, y) in a 2-dimensional coordinate system. Hereinafter the coordinate in the grid is defined as grid coordinate.

Therefore, when each of multiple positional informations is indicated by the grid coordinate, the detailed position of the traffic congestion, can be obtained, such as a specific position on the road in the area.

The traffic congestion information indicates the degree of the traffic congestion, and is indicated by four steps of levels depending on the degree of the traffic congestion. In the present embodiment, the following levels are used as these four steps of levels. The no-congestion state is Level 1, the congested state is Level 2, the heavily congested state is Level 3, and the unknown state is Level 4.

Additional information is the multimedia information, such as information indicated by a text, a graphic (icon), an image, and a voice, and is added to congestion degree information as the complementary information.

For example, a video image of the traffic situation, a graphic (icon) indicating the traffic congestion, and a voice message telling the existence of the traffic congestion, are used as this additional information.

Incident/Traffic Regulation Information

FIG. 5 is the explanatory view showing the construction of the driver assist information generated by the driver assist information generator when the informational category of the real time information is the traffic information and the detailed category of the traffic information is incident/traffic regulation information. The incident/traffic regulation information indicates the detail and the cause of the regulation.

As shown in FIG. 5, incident/traffic regulation information generated by the driver assist information generator 4 has positional information, detail information, time information, and additional information.

Positional information indicates the position where the incident/traffic regulation is occurring. This position is indicated by an area ID, a link ID, and a grid coordinate.

The detail information indicates the detail of the event or the regulation of the traffic condition. In this detail information, the detail of the event, such as road works, the detail of the regulation like reduction in a lane, and the detail information indicating the origin point and destination point of the regulated section, are contained.

The time information indicates the time period and time zone of the incident/regulation. In the time information, the time period information, which indicates the time period from the start day to the end day of the incident/regulation, and the time zone information, which indicates the time zone from start time to the end time of the incident/regulation are contained.

Additional information is multimedia information, such as information indicated by a text, a graphic (icon), an image, and a voice, and is added to the detail information as the complementary information. For example, a video image of the traffic regulation, a graphic (icon) indicating the traffic regulation, and a voice message telling the existence of the traffic regulation, are used as this additional information.

Parking/Rest Area Information

FIG. 6 is the explanatory view showing the construction of driver assist information generated by the driver assist information generator when the informational category of real time information is traffic information and the detailed category of traffic information is parking/rest area information. The parking/rest area information indicates the information with regard to the parking and the rest area.

As shown in FIG. 6, parking/rest area information generated by the driver assist information generator 4 has positional information, parking/rest area information, and additional information.

Positional information indicates the location of the parking, the rest area, and the like. This positional information is indicated by an area ID, a link ID, and a grid coordinate. In the present embodiment, since the range of the parking and the rest area are generally wide, the position of the parking and the rest area may be indicated by the central position of the parking and the central position of the rest area, respectively.

Parking/rest area information includes complementary positional information, appellation information, parking congestion information, rest area information, facility information.

Complementary positional information is supplemental information, e.g., an address, a postal code, and a phone number of the specific facility, such as parking. Appellation information is the name of each of the parking or the rest area.

Parking congestion information indicates the constantly varying information, such as the congestion state or waiting time of parking or the rest area.

Facility information indicates the information with regard to a facility, such as privileges information, discount of parking fee, the opening hour and capacity of the parking, and the existence of the restaurant.

The additional information is multimedia information, such as information indicated by a text, a graphic (icon), an image, and a voice, and is added to the facility information as the complementary information. For example, a guide map of the parking, a location map of the rest area, a photograph of the facility, text information of menu of the restaurant, and a photograph or an image of menu of the restaurant, are used as the additional information.

Travel Time Information

As shown in FIG. 7, the driver assist information generated by the driver assist information generator 4 is composed of positional information, travel time information, and additional information.

Travel time information indicates the approximate time to be required for traveling. As shown in FIG. 7, travel time information generated by the driver assist information generator 4 has section travel time information and link travel time information.

Section travel time information indicates the approximate time to be required for passing through the specific section of the road. If there are many routes between the start point and the end point of travel, this section travel time information is generated for each route.

Link travel time information indicates the approximate time to be required in order to pass through the road having a specific VICS-link's ID. This link travel time information is also generated for each route, if there are many routes between the start point and the end point.

Positional information is common to both section travel time information and link travel time information. This positional information indicates the position of the specific section of the road, and is mainly indicated by a grid coordinate and a link ID.

When the positional information is indicated by the grid coordinate, the specific section of the road is indicated by each of the grid coordinates of the origin point of the section, and destination point of the section, and the via point.

Link travel time information contains the information, which indicates the time to be required in order to pass through the road having a unique link ID. In the present embodiment, the information, which tells that it requires 10 minutes in order to pass through the road having the link ID=100, and the information, which tells that it requires 30 minutes in order to pass through the road having the link ID=90, serves as an example of this link travel time information.

Link travel time is not limited to the information, which tells the time to be required in order to pass through the road having only one link ID. For example, the information, which tells the time to be required in order to pass through two or more roads having a different link ID, such as roads from the road having the link ID=100 to the road having the link ID=120, can be adoptable.

Additional information is the multimedia information, which complements section travel time information and link travel time information, and is indicated by a text, a graphic (icon), an image, and a voice.

For example, in case of section travel time information, the virtual image, the real image, the text information, and the graphic (icon) are corresponding to this additional information. Here, the virtual image or the real image show a state of the road. The text information indicates a time to be required in order to arrive at end of the section. The graphic (icon) displays a building, such as gas station existing within the specific section of the road, which are used as the landmark.

In case of link travel time information, on the other hand, additional information is the information relevant to link travel time information. In the present embodiment, the information, such as text information, graphic information, and image information, which are indicated on the Map of the display device 24, and the voice message, which tells the information (contents) to the occupant, correspond to this additional information.

Weather Condition Information

As shown in FIG. 8, weather condition information generated by the driver assist information generator 4 is composed of positional information, weather information, and additional information.

Positional information indicates the place where the weather condition information is supplied. This positional information is indicated by an area ID, a link ID, and a grid coordinate.

The weather information indicates the concrete weather conditions, and is the information relevant to an atmospheric phenomenon, such as weather condition, air temperature, and humidity. When the detailed category of weather information is weather condition, the fine weather, the cloudy, the rain, and the warning notice of heavy rain correspond to this weather condition.

Additional information is multimedia information, and is complementary information of weather condition information, and the weather-chart and the weather symbol corresponds to this additional information Touristic Information Touristic information indicates the tourist facilities, and the sight spot. Touristic information generated by the driver assist information generator 4 is composed of positional information, touristic information, and additional information.

The positional information indicates the location of the tourist facilities and sight spot, and is indicated by an area ID, a link ID, and a grid coordinate.

Touristic information is mainly text data, which is an explanation of the tourist facilities and the sight spot.

Additional information is information relevant to the sight spot of the tourist facilities, e.g., a symbol mark, a voice message, a text message, a photograph, and the image.

In the present invention, the driver assist information generator 4 generates the driver assist information having above described real time information and multimedia information.

The content categories of real time information are not limited to the above described categories. For example, facility information showing the shopping mall, the fire station, the police station, and so on, may be acceptable as the category of this real time information.

Next, the functions of each component, contained in the driver assist information transmitter 2, will be explained.

As shown in FIG. 1 and FIG. 13A through FIG. 13D, the coded data compactor 5 performs the coding of driver assist information, which is generated by the driver assist information generator 4, in order to obtain coded driver assist information. Here, since this coding is performed using the prescribed description language, coded driver assist information is equivalent to driver assist information described by the prescribed description language.

Then, the coded data compactor 5 performs the compaction of coded driver assist information in order to obtain compacted coded driver assist information. Here, the compaction is performed in order to reduce the informational amount of coded driver assist information.

In the present invention, since handling of information would be facilitated, it is favorable that the coding is performed using the same prescribed description language.

In the present embodiment, furthermore, if XML (Extensible Markup Language) is adopted as this description language, the content of information is expressed between the tag indicating the start (start tag) and the tag indicating the end (end tag). Thus, if the word which shows the contents of the information is used as tag name, not only the contents of the data but also the meanings of the information can be easily realized by a person or a system, which can read the XML text.

In the present embodiment, XML is used as prescribed description language because of the advantages shown below.

1) The data exchange, while keeping the data structure of information and without losing the discrimination of the information, can be carried out, because information is described using a tab.
2) Not only the modification of the system specification but the data exchange between different systems can be easily performed.
3) A user can flexibly define the tag name.

The coded data compactor 5 performs the coding to each driver assist information, which is generated to each element of real time information by the drive assist information generator 4, and generates coded driver assist information in the form of XML.

In the present embodiment, as shown in FIG. 13A through FIG. 13D, in advance of the coding, driver assist information is divided into a common part and an information part. Then, the coded data compactor 5 performs the coding of the common part and the information part, separately. Thus, coded driver assist information composed of a coded common part and a coded information part is obtained.

In the common part, the information common to each driver assist information is contained. The provision time of information, the version of information, and the parameters specifying the GPS system are included in this information contained in the common part.

In the information part, on the other hand, the actual elements of the information to be provided to the occupant of the mobile station are contained. That is, the real time information, such as traffic congestion information, link travel time information, incident/regulation detail information, parking/rest area information, and section travel time information, multimedia information relevant to this real time information, and positional information are contained in this information part.

As shown in FIG. 9 and FIG. 10, when real time information generated by the driver assist information generator 4 is traffic congestion information, the link ID of positional information is 100, congestion degree information is Level:3 (congesting), and additional information is text message "Spontaneous traffic congestion. It will be cleared by 10 p.m.", the coded driver assist information generated by the coded data compactor 5 becomes in the form shown in FIG. 10.

Here, <congestion-info> is the start tag of traffic congestion information, </congestion-info> is the end tag of traffic congestion information. <location> is the start tag of positional information, </location> is the end tag of positional information.

In the XML description of <congestion no="1" version="0" expire="10:55">, "1" is the unique identification number of the elements contained in traffic congestion information. "0" shows the number of times of update. "10:55 is an expiration date of information.

For example, when there is another information other than this and if this another information is defined as element 2, the XML description of coded driver assist information, which is relevant to the element No. 2 of traffic congestion information, is described as <congestion no="2">.

As shown in FIG. 11 and FIG. 12, when real time information generated by the driver assist information generator 4 is Incident/traffic regulation information, the link ID of the positional information is "link ID=830", the cause of the regulation is "traffic accident", the detail of regulation is "Road closure", the time period is "1 hour", and additional information contains text information, symbolic information, image information, voice information, graphic information. The coded driver assist information is described as shown in FIG. 12.

In this case, text information is the message of "Road closure caused by traffic accident, it takes about 1 hour to the release of regulation". Code number of symbol information is "7a21", the file name of image is "m2346.mpg", the file name of voice is "m2346.wav", file name of graphic is "m2346.jpg".

After the coding of real time information, the coded data compactor 5 performs the compaction of coded driver assist information, which is obtained by the coding of driver assist information, in order to obtain compacted coded driver assist information.

Figure 13A:
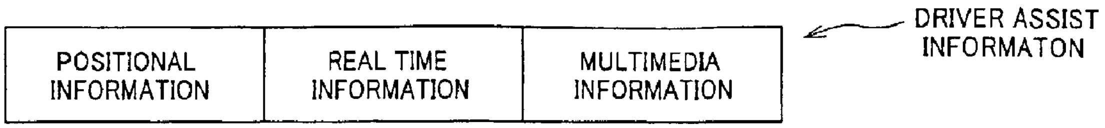
FIG. 13A is an explanatory view showing the construction of driver assist information generated by the driver assist information generator.
Figure 13B:
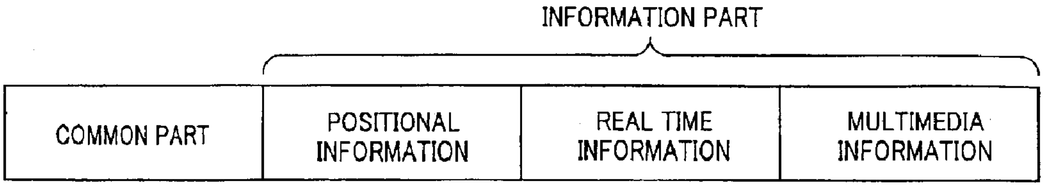
FIG. 13B is an explanatory view showing the construction of driver assist information divided into the common part and the information part.
Figure 13C:
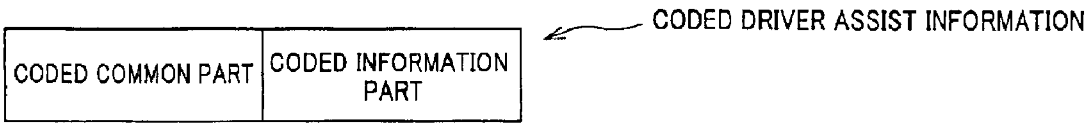
FIG. 13C is an explanatory view showing the construction of coded driver assist information.
Figure 13D:
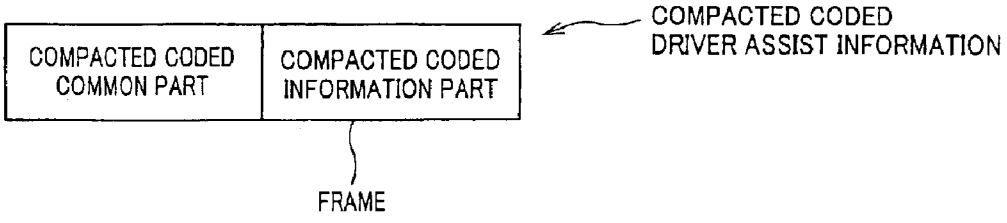
FIG. 13D is an explanatory view showing the construction of compacted coded driver assist information.

In this case, as shown in FIG. 13C and FIG. 13D, since coded driver assist information is composed of the coded common part and the coded information part, the obtained compacted coded driver assist information is also composed of the compacted coded common part and the compacted coded information part.

In the present embodiment, since the coding is performed using XML language, the XML description contains a lot of same tag. For example, if the road having the link ID=120 is described by the XML language, the road whose link ID=120 is described as <line><link-ID>120</link-ID></line>. In this XML description, road is indicated as the tag <line>, and the VICS-link ID is indicated as the tag <link-ID>.

That is, in the XML description of coded driver assist information, there are a lot of same tag, such as<link-ID>, <line>, and so on. If these tags are replaced with the same unique compaction code, such as four-digit number 0111 of binary form, high compressibility of data can be achieved.

In the present embodiment, furthermore, in addition to the compaction, which is performed by replacing the same word in the XML description with the same compaction code, each element of the multimedia information other than the same word (tag part) is compacted into the binary form. Thereby, further high compressibility of data can be achieved.

In the present embodiment, still furthermore, the specific multimedia information may be replaced with the unique dictionary code, such as fifth digit number "10010" of binary form in order to achieve still further compressibility of data, which are broadcasted from the driver assist information transmitter 2.

In this case, if voice data, image data, and graphic data, to which the unique identification number is assigned, are previously recorded on the recording media 28 equipped in the driver assist information receiver 3, the driver assist information is speedily supplied to the occupant of the mobile station together with voice, image, and graphic, irrespective of the current position of the mobile station. This is because the multimedia information having a unique dictionary code is not required when broadcasting the driver assist information.

In the present embodiment, compacted coded driver assist information is obtained after performing the coding and compaction of driver assist information. Since this driver assist information is generated about each element of real time information, the coded data compactor 5 generates compacted coded driver assist information as many as the number of the elements of real time information.

Event Module Constitutor

The event module constitutor 6 organizes all the compacted coded information part of compacted coded driver assist information generated by the coded data compactor 5.

Figure 14:
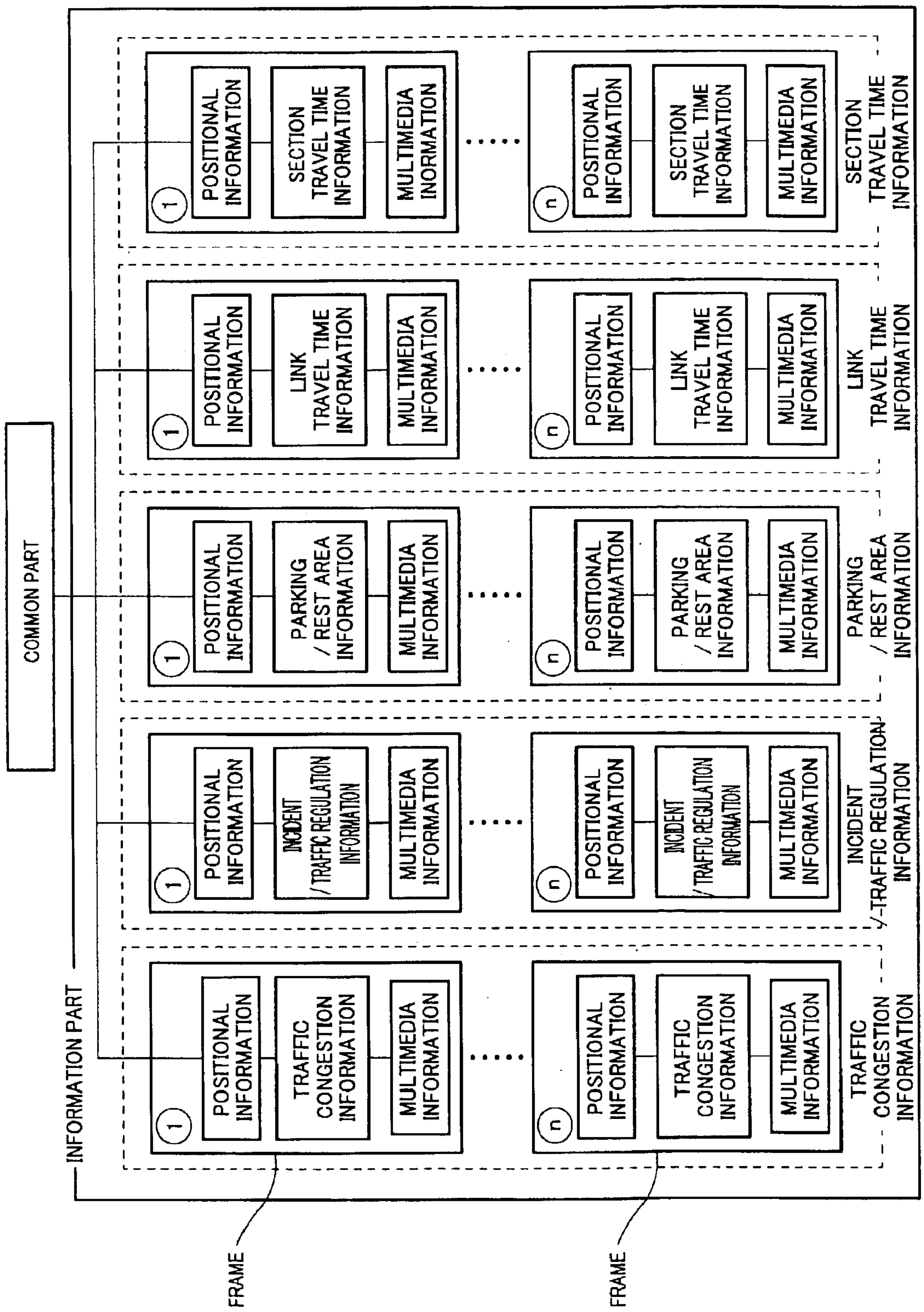
FIG. 14 is an explanatory view, which indicates compacted coded driver assist information organized by the event module constitutor 6, wherein compacted coded driver assist information is divided into the compacted coded common part and the compacted coded information part, and each element of the compacted coded information part is distributed according to the category of the real time information as frame.
Figure 15:
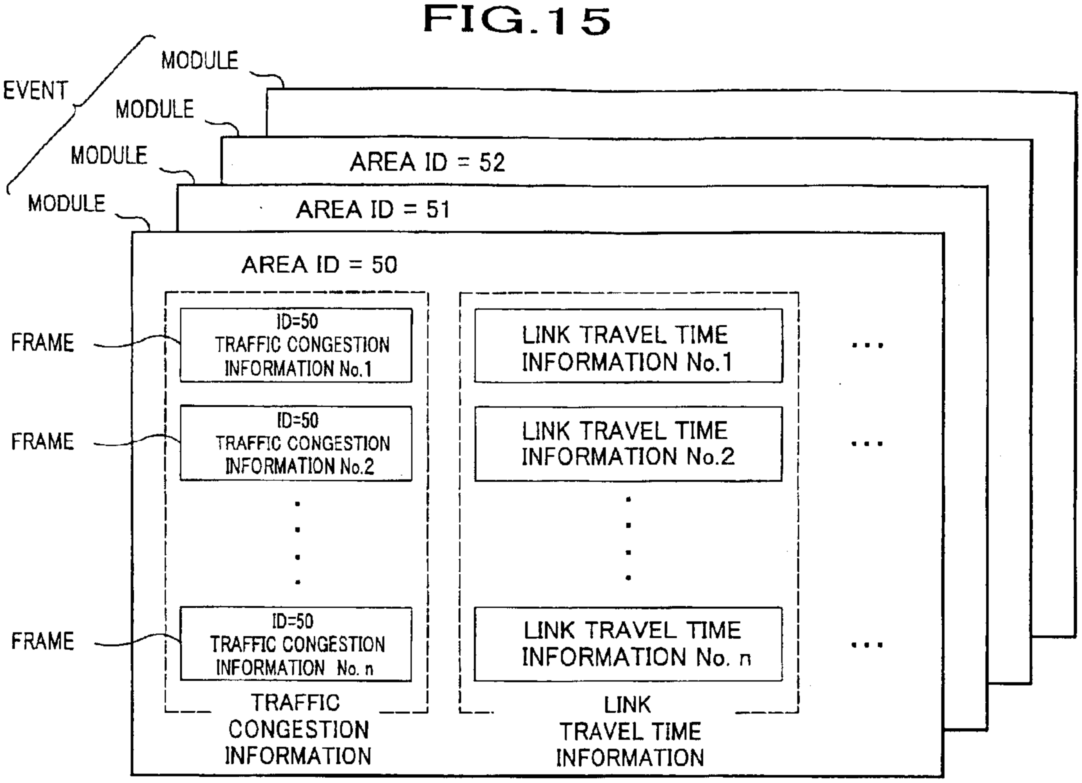
FIG. 15 is an explanatory view showing the construction of the module, which is obtained by distributing each frame to the area based on positional information contained in each driver assist information.

In the present embodiment, as shown in FIG. 13D and FIG. 14, the compacted coded information part is the minimum unit of the information to be transmitted to the driver assist information receiver 3. Hereinafter, this compacted coded information part is defined as a frame.

Then, the event module constitutor 6 classifies every frame according to the category of real time information. Next, the event module constitutor 6 arranges the classified frame for every area (secondary mesh division) based on the positional information included in the frame. Hereinafter, this arranged compacted coded information part is defined as a module. Then, the event module constitutor 6 collects all modules, which are generated at the same time, and constructs an event.

In other words, as shown in FIG. 13 and FIG. 14, the event module constitutor 6 treats the compacted coded information part as the frame, which is the minimum unit to be transmitted to the driver assist information receiver 3. The event module constitutor 6, subsequently, classifies each of the frames (the compacted coded information part) by the informational category of real time information. This classification is performed based on the detailed category of real time information, such as traffic congestion information and link travel time information, which are contained in the frame (the compacted coded information part).

On this occasion, since the compacted coded common part is the information common to each of compacted coded driver assist information, the compacted coded common part is separated from each of the frames (the compacted coded information part), and one common part is used as the common part.

As described above, the event module constitutor 6 separates the compacted coded common part, which has the information common to each of compacted coded driver assist information. Then, the event module constitutor 6 adds only one compacted coded common part to the assembly of the compacted coded information part (frame). Thus, since the overlapping of useless data was excluded, the load in the case of broadcast of driver assist information is mitigated.

Then, the event module constitutor 6 distributes each of the frames to the prescribed area based on positional information contained in each of the frames (the compacted coded information part), respectively. For example, the frame, which has the positional information of area ID=50, is distributed to the area (secondary mesh divisions) of area ID=50. The frame, which has the positional information of area ID=51, is distributed to the area (secondary mesh divisions) of area ID=51. Then, each of the frames distributed to the prescribed area (secondary mesh divisions) is arranged in compliance with the informational category of real time information.

Then, each of the frames distributed to the area (secondary mesh divisions) is correlated with the specific position of/on the area (secondary mesh division) based on the positional information, such as link ID and the grid coordinate. To be more precise, each of the frames is correlated to the specific road or the specific position on the Map, which corresponds to the secondary mesh divisions.

Figure 16:
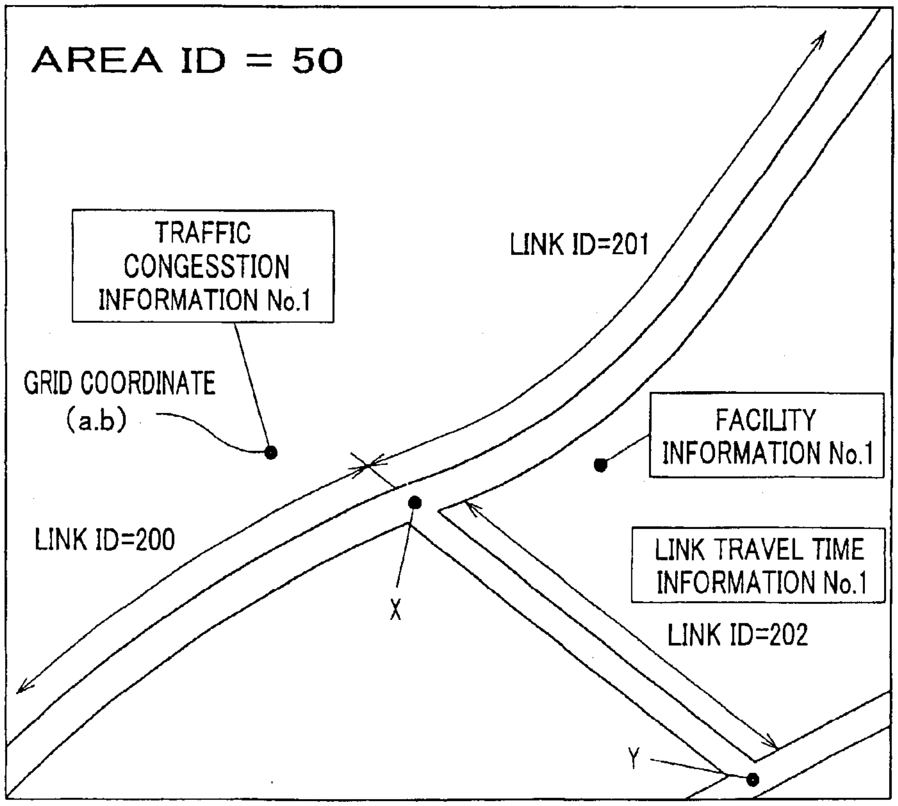
FIG. 16 is an explanatory view, which shows frames to be associated with each specific position of the area.

FIG. 16 is an explanatory view showing this correlation.

When the area ID of positional information with regard to the traffic congestion information No. 1 is 50 (area ID=50) and the grid coordinate is (a, b), the position, where the traffic congestion information No. 1 is provided to the occupant of the mobile station, is determined on the Map of area ID=50, based on this positional information.

When the area ID of positional information with regard to the link travel time information No. 1 is 50 (area ID=50) and the link ID is 202, the position, where the link travel time information No. 1 is provided to the occupant of the mobile station, is determined on the road of link ID=202. Thereby, the approximate time to be required for passing through the road of link ID=202 is assigned to the road of link ID=202. To be more precise, the driver assist information, which tells "the approximate time to be required for passing from Point X to Point Y is 20 minutes", is assigned to the specific road.

As mentioned above, each the frames is distributed to each of the areas (the secondary mesh division), and is correlated with the specific position or the specific road within the area.

Figure 17:
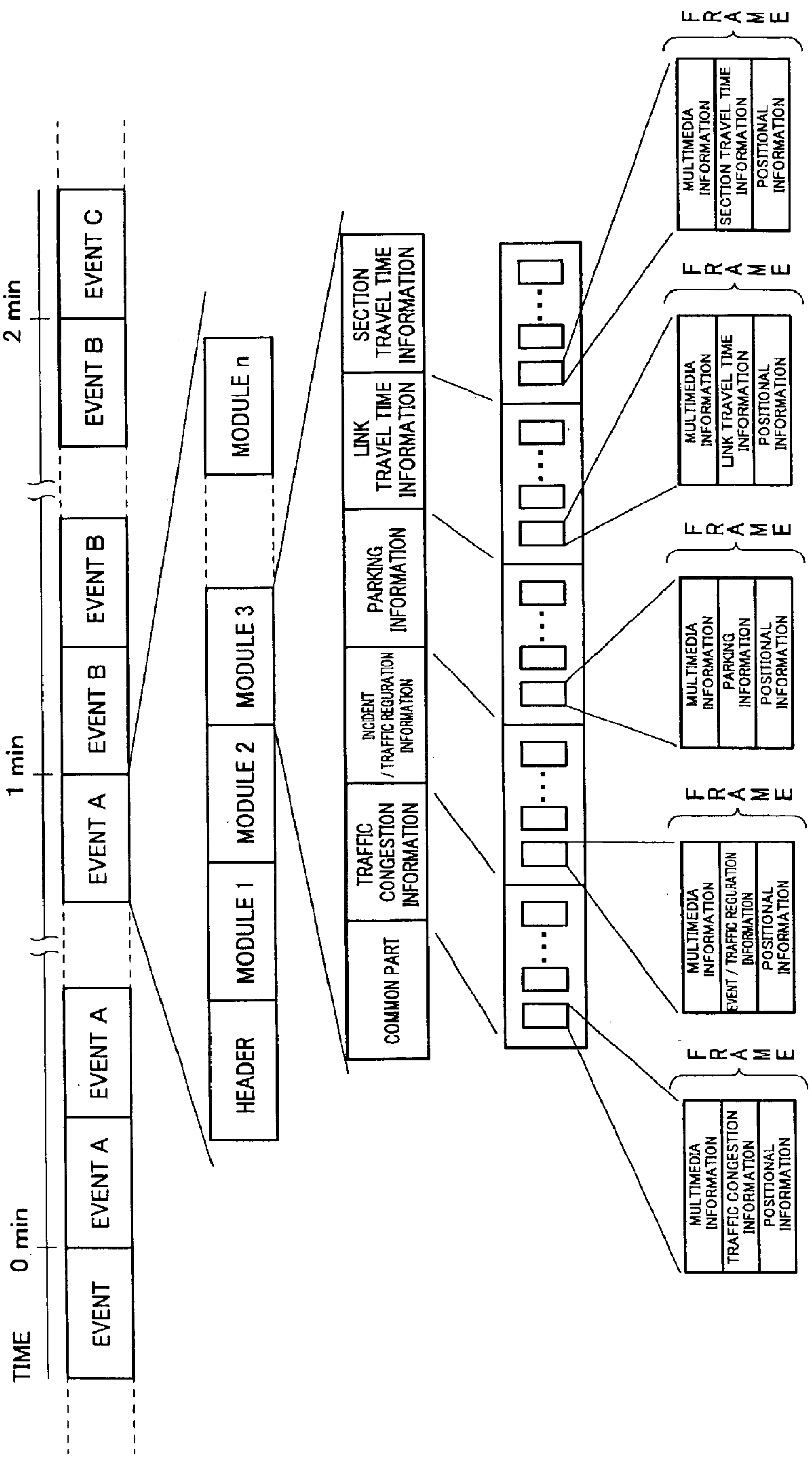
FIG. 17 is an explanatory view showing the construction of the event to be broadcasted from the transmitter 7.

Then, as shown in FIG. 17, the event module constitutor 6 regards each of the areas (secondary mesh divisions), to which frames have been distributed, as module, respectively. Next, the event module constitutor 6 collects all modules that have the driver assist information, which was generated at the same time, and constructs the event from these collected modules.

In the present embodiment, to be more precise, since one module is produced from one area (secondary mesh division), the number of the module, which is contained in the event, is the same as the number of area. That is, the number of the module becomes the same as the number of the identification number of the area ID, Then, the event module constitutor 6 transmits the event to the transmitter 7.

The transmitter 7 modulates the event transmitted from the event module constitutor 6 based on a specific method, such as OFDM (Orthogonal Frequency Division Multiplexing). In other words, the transmitter 7 modulates the event into the modulated event based on the OFDM method, and broadcasts the modulated event repeatedly at a suitable cycle.

Here, the span of the fixed cycle is not limited in the specific range. When the span of the suitable cycle is 1 minute and the generation of the driver assist information is performed at interval of 5 minutes, for example, the event of the same contents is broadcasted a total of 4 times at interval of 1 minute.

In the present embodiment, since the modulated event is broadcasted repeatedly at a suitable cycle, the event of the same contents is broadcasted at short interval. Thus, the receiver side (mobile station) can receive the up-to-date driver assist information at short interval even if driver assist information are not received by the receiver side (mobile station), just after the start-up of the receiver (mobile station).

Moreover, if the receiver side (mobile station) cannot receive the modulated event, such as in case of communication failure, since the event of the same contents is repeatedly broadcasted at short interval, the receiver side (mobile station) can complement the lacking data of the event.

Next, the event constructed by the event module constitutor 6 will be explained.

FIG. 17 is an explanatory view showing the construction of the event, which is broadcasted from the transmitter 7.

As shown in FIG. 17, the transmitter 7 broadcasts the event of the same contents repeatedly until a next new event is generated. Each of the events has one header and a plurality of modules.

The header contains the information common to each of the modules in addition to the information with regard to the common part of driver assist information. In this information common to each of the modules, the event number, the date of update of information, the transmitting time period of the event, the number of the modules included in the event, and the type of data included in the event, are contained.

The module is obtained by distributing the frame (the driver assist information) at every predetermined area, such as secondary mesh divisions. When the predetermined area is defined to be every all-prefectures unit, for example, the module 1 corresponds to Hokkaido, the module 2 corresponds to Aomori Prefecture, the module 3 corresponds to Iwate prefecture, . . . , the module 47 corresponds to Okinawa Prefecture.

On this occasion, the driver assist information with regard to the various detailed categories, such as traffic congestion information, incident/traffic regulation information, and weather condition information, are contained in each module as a frame. Here, the number of the frame is the same as the number of the element of the driver assist information, and the element is the concrete phenomenon of real time information.

When the element of real time information contained in the module 1 (corresponds to Hokkaido area) is weather condition information, for example, the element No. 1 represents the weather of Sapporo, the element No. 2 represents the weather of Asahikawa, and the element No. 3 represent the weather of Hakodate.

As described above, in the present embodiment, the event contains the cluster of frames (the information part of driver assist information), which were generated to various kinds of elements, at every prescribed area.

Next, the motion of the driver assist information transmitter 2 will be explained with reference to FIG. 13 through FIG. 18.

Figure 18:
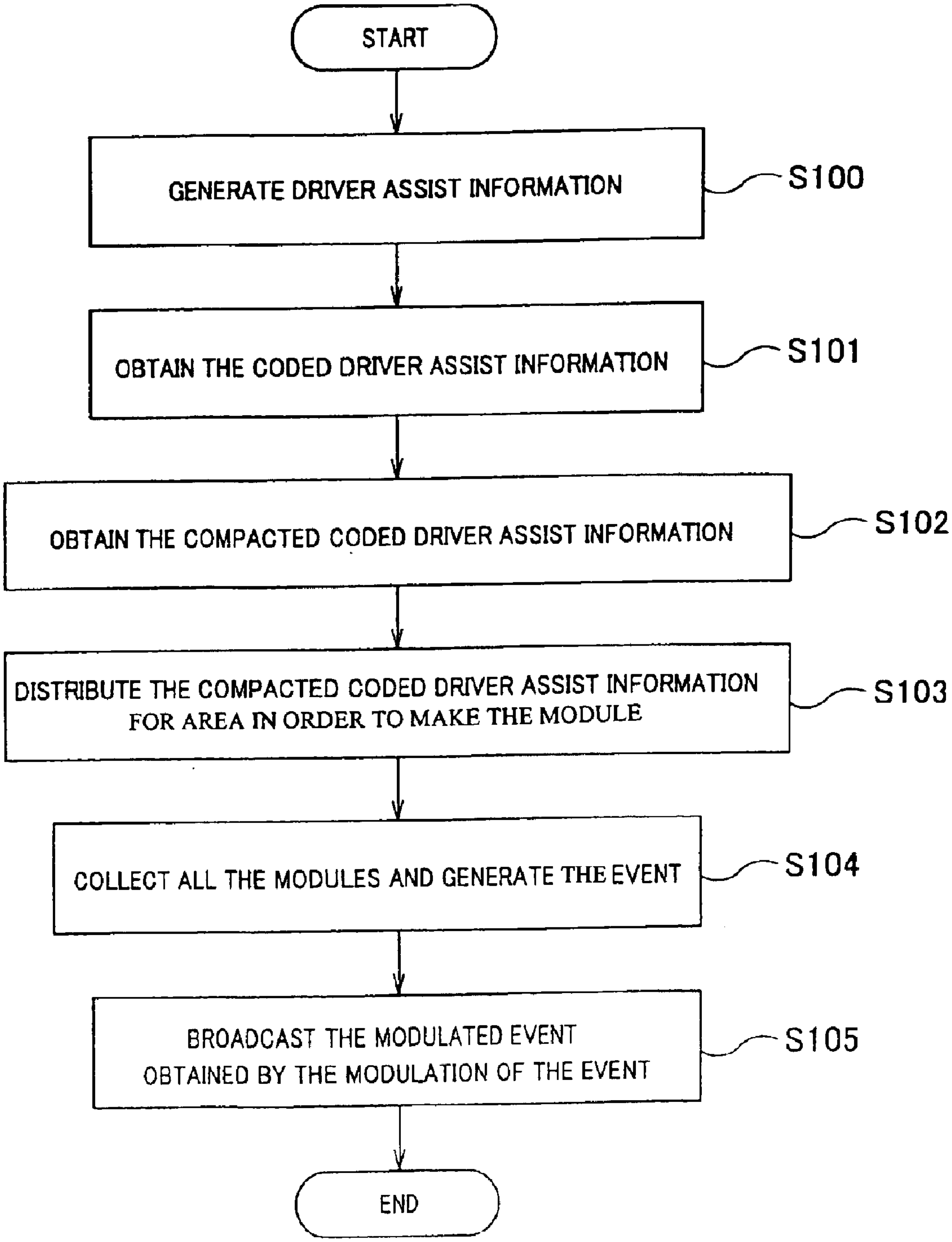
FIG. 18 is a flow chart, which shows the operation of the driver assist information transmitter 2.

FIG. 18 is a flow chart explaining the operation of the driver assist information transmitter 2.

The driver assist information generator 4 of the driver assist information transmitter 2 performs the readout of real time information, multimedia information, and positional information from the information recording media 8. Here, multimedia information and positional information are the information being associating with the extracted real time information.

Then, the driver assist information generator 4 generates driver assist information by adding both positional information and multimedia information to each element of real time information.

In other words, the driver assist information generator 4 generates driver assist information of the same number as the elements of real time information (Step 100, FIG. 13A), and then, transmits the generated driver assist information to the coded data compactor 5.

The coded data compactor 5 divides the inputted driver assist information into the common part and the information part. The common part is the information common to each element of the inputted driver assist information. The information part is the information indicating the concrete contents of the element of driver assist information (FIG. 13B).

Then, the coded data compactor 5 performs the coding of the common part and the information part, separately, and generates coded driver assist information, which is composed of the coded common part and the coded information part (Step 101, FIG. 13C). After the coding of driver assist information, the coded data compactor 5 performs the compaction of coded driver assist information, and generates compacted coded driver assist information (Step 102, FIG. 13D). Here, compacted coded driver assist information is composed of the compacted coded common part and the compacted coded information part.

Next, the coded data compactor 5 transmits the generated compacted coded driver assist information to the event module constitutor 6.

When the event module constitutor 6 receives compacted coded driver assist information, the event module constitutor 6 classifies compacted coded driver assist information based on the detailed category of driver assist information. Then, the event module constitutor 6 distributes the classified compacted coded driver assist information to the area (secondary mesh division) based on the positional information contained in compacted coded driver assist information (Step 103, FIG. 15).

The compacted coded driver assist information distributed to each area is correlated to the specific position or the specific road within the area (secondary mesh division) based on the positional information contained in compacted coded driver assist information (compacted coded information part)(FIG. 16).

Then, the event module constitutor 6 regards each of the areas (secondary mesh divisions) as modules, respectively. Next, the event module constitutor 6 collect all modules including the driver assist information generated at the same time zone, and constructs the event from these collected module (Step 104, FIG. 17).

Finally, the event module constitutor 6 transmits the event to the transmitter 7.

The transmitter 7 modulates the event into the modulated event, and broadcasts the modulated event repeatedly till the next new event is generated.

The Driver Assist Information Receiver

As shown in FIG. 1, the driver assist information receiver 3 is composed of an event demodulator 20, a driver assist information obtainer 21, a current position obtainer 22, a driver assist information arranger 23, a display device 24, and a controller 25.

The event demodulator 20 receives the modulated event broadcasted from the driver assist information transmitter 2 by means of a receiver 26. Then, the event demodulator 20 performs the digital demodulation on the modulated event, and obtains the event. Then, the event demodulator 20 transmits the event obtained by the digital demodulation to the driver assist information obtainer 21.

The driver assist information obtainer 21 checks whether or not the event now received is already received by checking the header contained in the event when the modulated event is received.

If the event is not received, the driver assist information receiver 3 extracts the module from the event, and performs the decompression on each of the modules in order to obtain coded driver assist information.

As shown in FIG. 13B through FIG. 13D, in the present embodiment, since compacted coded driver assist information has the compacted coded information part, the coded information part is obtained by the decompression of the compacted coded information part.

The driver assist information obtainer 21 performs the decoding of coded driver assist information (the coded information part) in order to obtain driver assist information. Then, the driver assist information obtainer 21 transmits the obtained driver assist information to the driver assist information arranger 23.

Here, the driver assist information obtained by the decoding is the driver assist information, which is distributed to each area (secondary mesh division) in the driver assist information transmitter 2. Thus, the driver assist information obtainer 21 obtains driver assist information at each of the areas (secondary mesh division).

The current position obtainer 22 obtains the current position of the mobile station equipped with the driver assist information receiver 3 by using the GPS-receiver 27.

Then, the current position obtainer 22 generates the positional information of the mobile station, which indicates the current position of the mobile station, and then transmits the generated positional information of the mobile station to the driver assist information arranger 23. Here, this positional information of the mobile station is indicated by the area ID, the link ID, and the grid coordinate.

The driver assist information arranger 23 selects the driver assist information to be required by the mobile station among the driver assist information transmitted from the driver assist information obtainer 21. On this occasion, this selection is performed based on the positional information of the mobile station transmitted from the current position obtainer 22.

Figure 19:
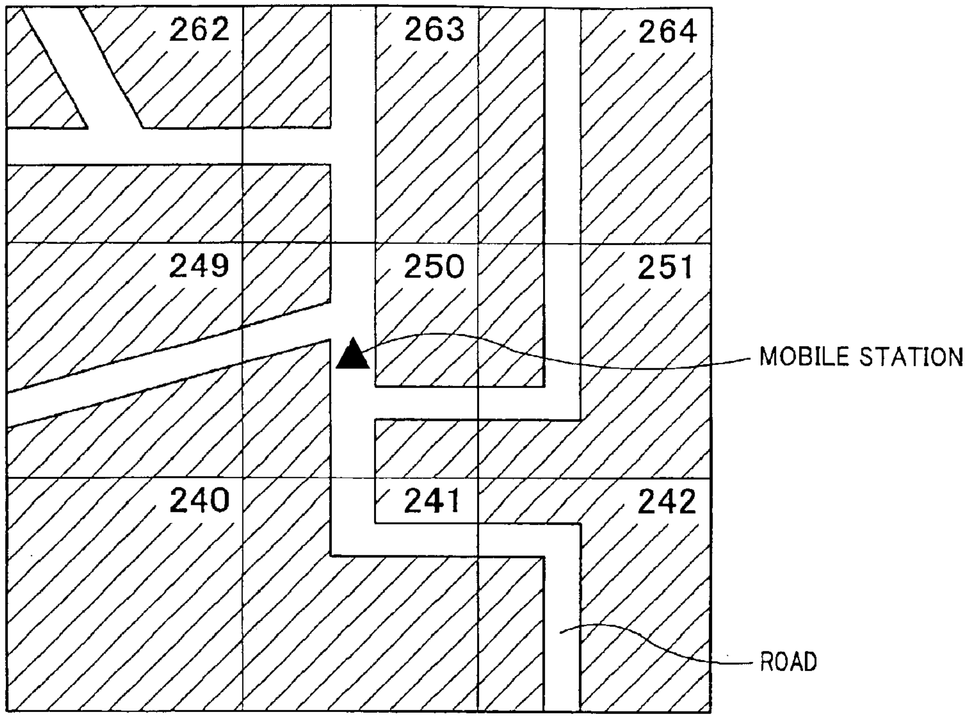
FIG. 19 is an explanatory view, which is used in order to explain the procedure of the selection of driver assist information by the driver assist information arranger 23

As shown in FIG. 19, for example, when the current position of the mobile station is within the area (second mesh division) of link ID=250, the driver assist information arranger 23 selects the driver assist information, which is contained in the area of area ID=250, and the driver assist information, which is contained in the area having the area ID adjoining to the area of area ID=250. Here, this selection by the driver assist information arranger 23 is performed to the driver assist information transmitted from the driver assist information obtainer 21. In this embodiment, as shown in FIG. 19, the areas of area ID=240, 241, 242, 249, 251, 262, 263, and 264 are selected in addition to the area ID=250.

The method of selecting these areas is not limited to the above described method. For example, the method of selecting the area wherein the mobile station is just positioning may be adoptable. Additionally, the method of selecting the area where the mobile station may move to can be adoptable.

If the mobile station equips the car-navigation system and the mobile station's destination was previously set up in the car-navigation system, the driver assist information arranger 23 may obtain all the driver assist information on a given route, on which the mobile station goes through, in advance. In this case, the driver assist information is given to the occupant of the mobile station at any time in the place where driver assist information is required. Thereby, if driver assist information is related to touristic information and the mobile station is moving at the tourist site, driver assist information becomes the most useful information for the occupant of the mobile station.

The driver assist information arranger 23, subsequently, performs the readout of the Map information associated with the driver assist information, which is selected among the driver assist information transmitted from the driver assist information obtainer 21, from the information recording media 28. Then, the driver assist information arranger 23 transmits the Map information to the display device 24 together with the selected driver assist information.

In the present embodiment, additionally, the category of the driver assist information to be displayed on the display device 24 is determined based on the setting condition, which is inputted from the controller 25. In the present embodiment, still furthermore, various kinds of information recording media, such as a hard disk drive HD, CD-ROM, and DVD-ROM may be adoptable as this information recording media 28.

Figure 20:
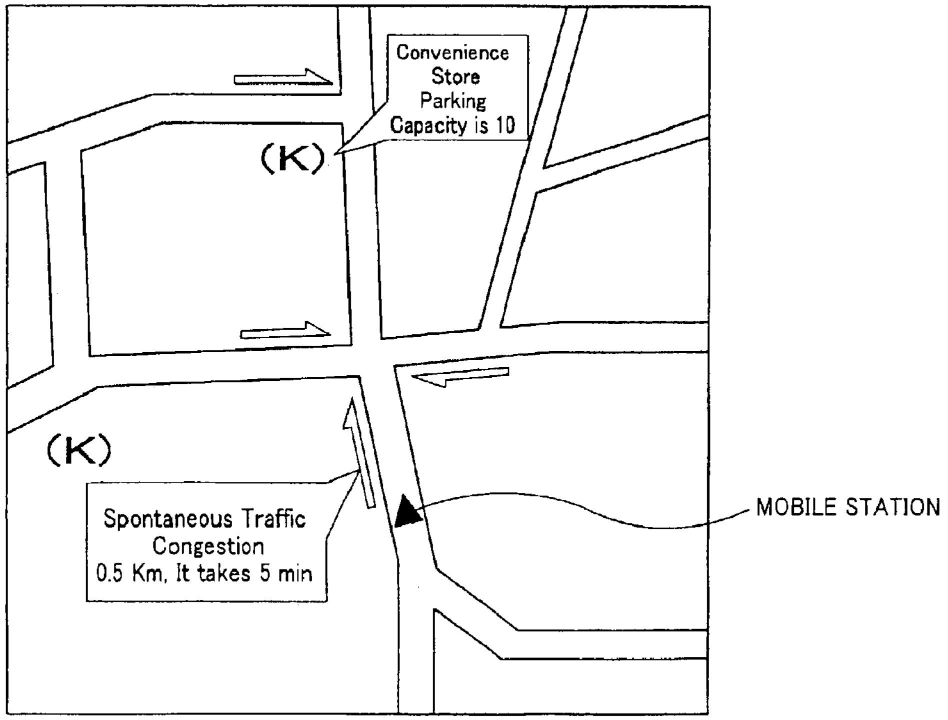
FIG. 20 is an explanatory view, which shows the example of driver assist information to be indicated on the display device 24.

When the detailed category of driver assist information to be displayed on the display device 24 is both of traffic congestion information and facility information and the contents category of facility information is convenience store, the driver assist information to be displayed on the display device 24 can be represented in the form shown in FIG. 20.

FIG. 20 is an explanatory view showing the driver assist information indicated on the display device.

In this FIG. 20, the current position of the mobile station is shown by ▲, each element of traffic congestion information is shown by the broad arrow, and the convenience store is shown by symbol (K).

In the present embodiment, since the multimedia information (additional information) is contained in driver assist information, the concrete condition of the traffic congestion information existing in the direction of the travel of the mobile station can be indicated as the text written in the balloon to be indicated on the display device 24 (FIG. 20).

In the present embodiment, the driver assist information is broadcasted towards the mobile station using the terrestrial digital broadcasting technique. Thus, not only text information but also the voice message and the video image of traffic camera recording the traffic congestion condition, can be supplied to the driver of the mobile station. As an example of this voice message, the voice message, which tells "It is 0.5 km traffic congestion forehead. It takes 5 minutes for passing through this traffic congestion.", can be adoptable.

In the present embodiment, as an example of the driver assist information relating to the convenience store, the information, such as Parking capacity information, Name information of convenience store, and Sales information, can be adoptable. On this occasion, these kinds of information are indicated on the balloon displayed on the Map as text. Additionally, these kinds of information may be notified to the occupant as the voice message.

In the present embodiment, the detailed category of driver assist information indicated on the display device 24 is controlled based on the setting condition, which is inputted by means of the controller 25. But if the category of driver assist information is emergency information, such as a traffic accident or casualty information, these kinds of information may be forcibly displayed on the display device 24 irrespective of the setting condition. In this case, the important information for the occupant of the mobile station, such as the traffic accident happening on a route of the mobile station, can be instantly issued to the occupant.

Next, the operation of the driver assist information transmitter 3 will be explained referring to FIG. 21.

Figure 21:
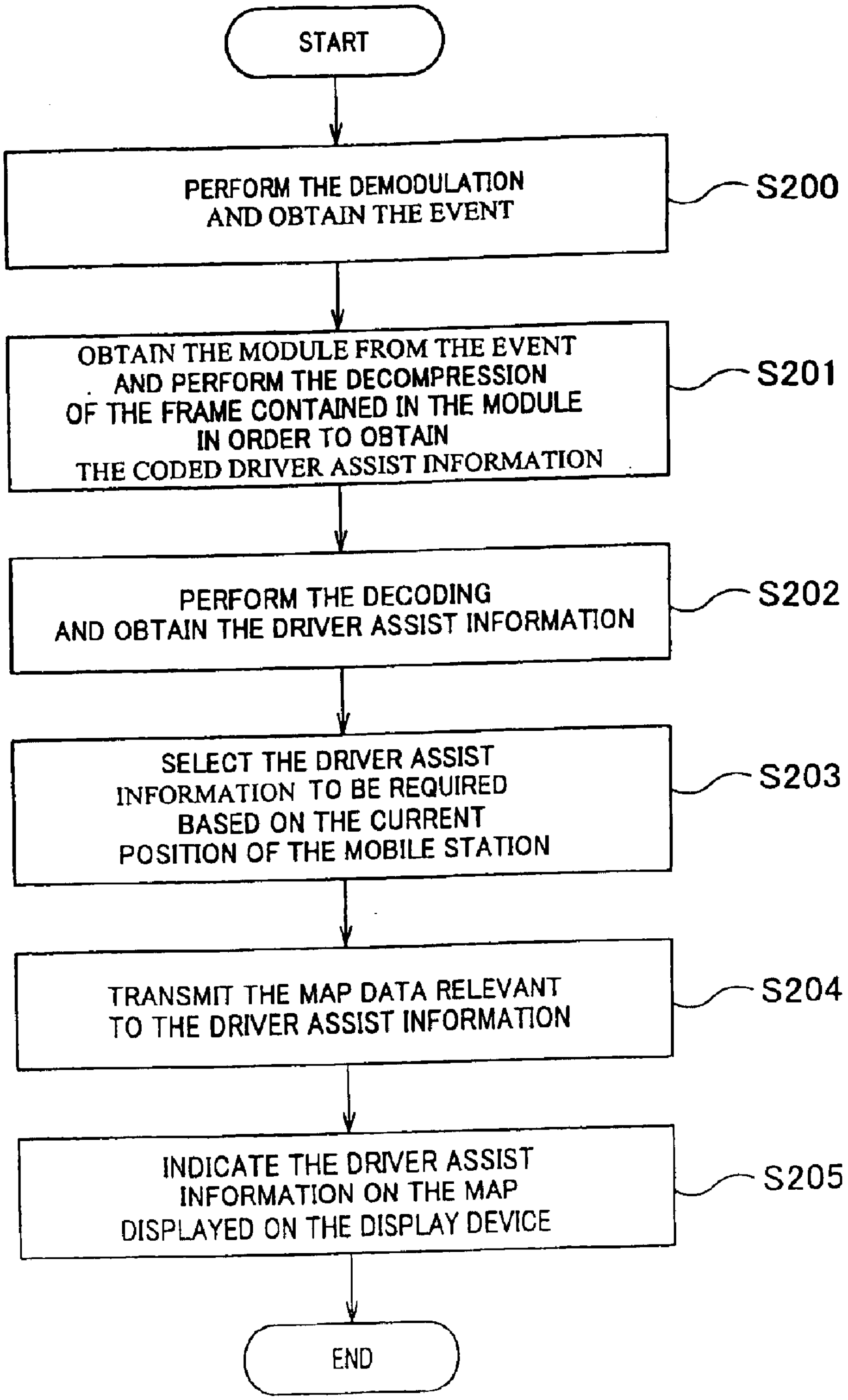
FIG. 21 is a flow chart, which shows the operation of the driver assist information receiver 3.

FIG. 21 is a flowchart explaining the motion of the driver assist information transmitter 3.

When the receiver 26 of the driver assist information receiver 3 receives the modulated event, which is broadcasted from the driver assist information transmitter 2, the event demodulator 20 performs the digital demodulation on the modulated event in order to obtain the event (Step 200). Then, the event demodulator 20 transmits the event obtained by the digital demodulation to the driver assist information obtainer 21.

The driver assist information obtainer 21 checks whether or not the event is already received by checking the header contained in the event when the event is inputted from the event demodulator 20. If the reception of the event by the driver assist information receiver 3 is the first time, the driver assist information receiver 3 extracts the module from the event.

Then, the driver assist information receiver 3 performs the decompression on each of the modules in order to obtain coded driver assist information, which is written by XML description (Step 201).

Then, the driver assist information obtainer 21 performs the decoding of the coded driver assist information (the coded information part) in order to obtain driver assist information (the information part)(Step 202), and then, transmits the obtained driver assist information (the information part) to the driver assist information arranger 23.

The driver assist information arranger 23 selects the driver assist information to be required by the mobile station among the driver assist information transmitted from the driver assist information obtainer 21 (Step 203). On this occasion, this selection is performed based on the positional information of the mobile station transmitted from the current position obtainer 22.

The driver assist information arranger 23, subsequently, performs the readout of the Map information relating to the driver assist information, selected among the driver assist information, from the information recording media 28. Then, the driver assist information arranger 23 transmits the Map information to the display device 24 together with driver assist information (Step 204).

The display device 24 provides driver assist information to the occupant of the mobile station by indicating the driver assist information on the Map displayed thereon (Step 205).

According to the driver assist information providing system 1 composed of the driver assist information transmitter 2 and the driver assist information receiver 3, since driver assist information are broadcasted using the terrestrial digital broadcasting technique, the occupant of the mobile station can obtain much larger information than using the conventional transition technique. Thereby, the amount of information to be transmitted is not limited in the system according to the present invention.

In the present invention, furthermore, the mobile station can obtain driver assist information without passing through the specific area, wherein the mobile station can obtain the driver assist information by communicating with the wireless communication device, like a conventional transmitting technique, which uses an infrared beacon and a radio beacon in order to transmit the data.

In the present invention, the display of Map on the display device 24 is achieved by using the map data, which is previously stored in the information recording medium 28 of the driver assist information receiver 3. But, the supply of this map data is not limited to this. For example, the Map data attached to the car navigation system, which has widely spread in recent year, can be adoptable.

In the present invention, the driver assist information is broadcasted using the terrestrial digital broadcasting technique. Therefore, it is also possible that the Map data is transmitted to the mobile station (driver assist information receiver 3) by including the Map data in the driver assist information.

In this case, the mobile station (driver assist information receiver 3) can obtain the up-to-date Map data even if a new road is opened to traffic. Thus, the mobile station (driver assist information receiver 3) can drive without losing the mobile station's way even if in the urban area, wherein the road changes frequently.

Finally, the operation examples of each component of the driver assist information providing system according to the present invention will be explained.

Generation of the Driver Assist Information

Figure 22:
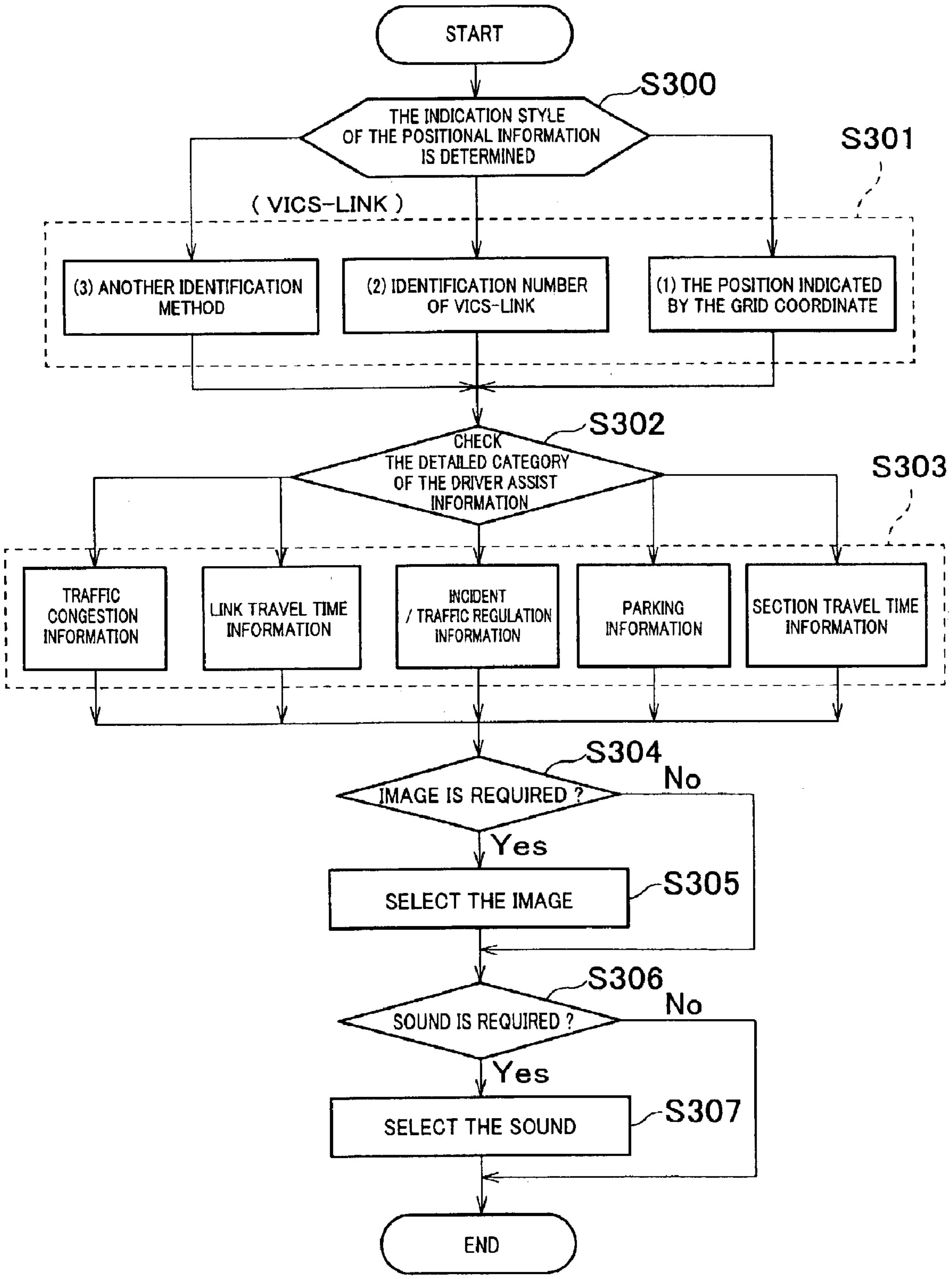
FIG. 22 is flow chart, which shows an example of the generation of driver assist information generated by the driver assist information generator 4.

FIG. 22 is a flowchart explaining the generation of the driver assist information to be performed in the driver assist information generator 4 of the driver assist information transmitter 2.

First, the indication style of positional information is determined for every element of real time information (Step 300).

In this case, the identification styles as described below are used in order to identify positional information. (1) The position indicated by the normalized coordinate style (grid coordinate). (2) The identification number of the VICS-link. (3) Another identification methods.

In this Step 300, at least one identification style described above is selected. But all the identification styles can be used for identifying positional information at the same time.

Then, the positional information expressed by the identification manner selected in Step 300 is generated, and is added to the corresponding elements of real time information (Step 301). Thereby, each element of real time information has at least one positional information.

Then, the detailed category of real time information is checked (Step 302), and then, each element of the real time information, to which the positional information was added, is classified based on the detailed category of real time information (Step 303).

Then, it is checked whether or not there is image information to be added to each element of real time information, which is classified based on the detailed category of real time information (Step 304).

If there is image information to be added, the image information, such as the still image, the animated image, and the graphic image, are added to the corresponding element of real time information (Step 305). On the other hand, when image information is not required, flow moves to Step 306.

In Step 306, it is checked whether or not there is voice information to be added to each element of real time information (Step 306).

When there is voice information to be added, the voice information, such as guide message and the beep sounds, are added to the corresponding element of real time information (Step 307). Thus, the generation of driver assist information is finished.

If voice information is not required, the generation of drive assist information is finished without adding the voice information.

Figure 23:
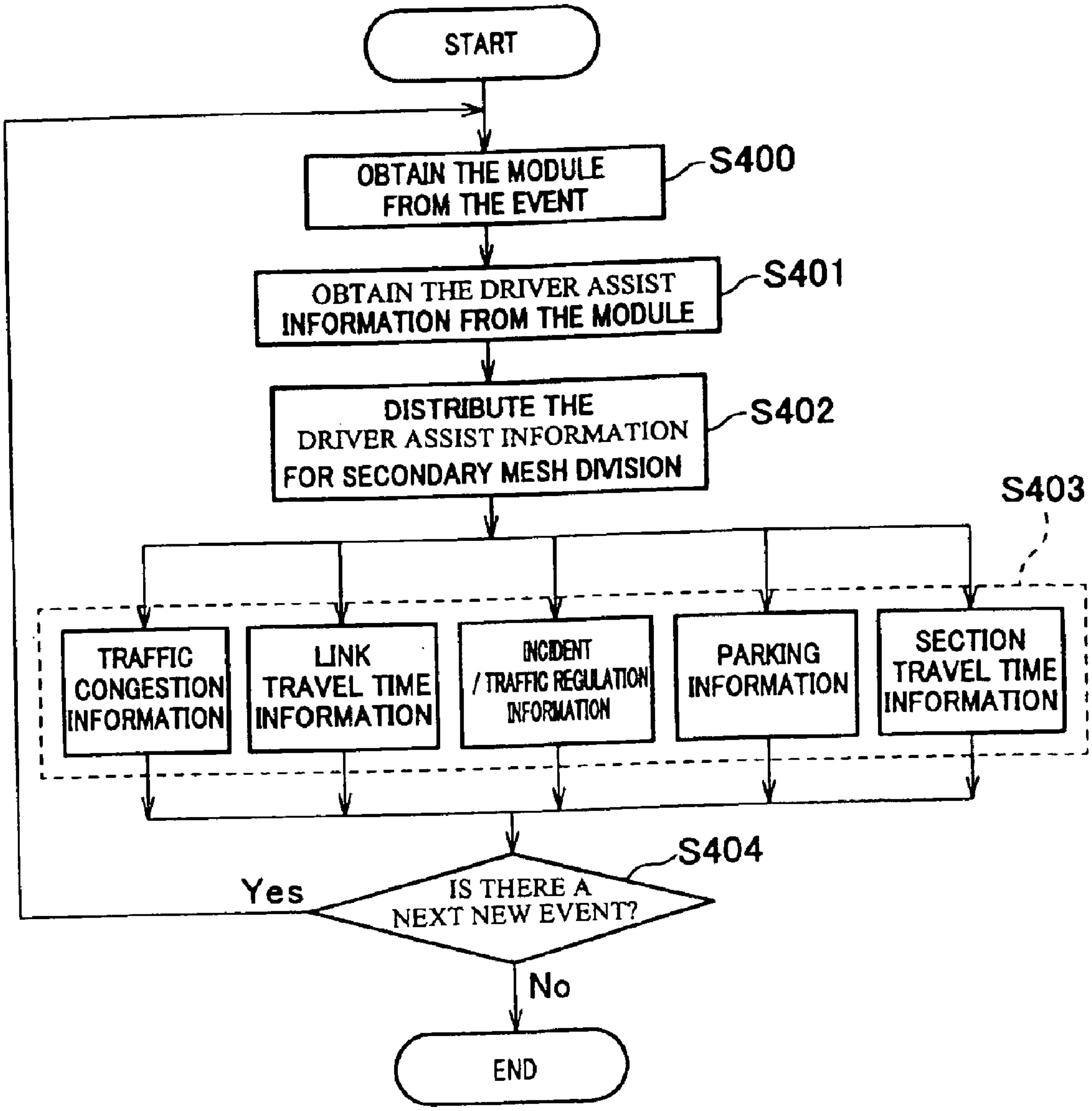
FIG. 23 is flow chart, which shows an example of the selection of driver assist information performed in the driver assist information obtainer 21.

Selection of the Driver Assist Information Performed in the Driver Assist Information Receiver FIG. 23 is a flowchart showing the selection of driver assist information performed in the driver assist information obtainer 21 of the driver assist information receiver 3.

The event demodulator 20 receives the modulated event broadcasted from the driver assist information transmitter 2 by means of the receiver 26. Then, the event demodulator 20 performs the digital demodulation on the modulated event in order to obtain the event, and transmits it to the driver assist information obtainer 21.

When the event is transmitted to the driver assist information obtainer 21, the driver assist information obtainer 21 checks whether or not the event is already received by checking the header contained in the event. If the event has not been received, the driver assist information obtainer 21 extracts the module from the event (Step 400).

Then, the driver assist information obtainer 21 performs the decompression of compacted coded driver assist information contained in the module in order to obtain coded driver assist information. Then, the decoding of the coded driver assist information is performed in order to obtain driver assist information (Step 401).

The obtained driver assist information is distributed to each of the secondary mesh divisions based on the positional information contained in driver assist information (Step 402).

The driver assist information distributed to each of the secondary mesh division is classified based on the detailed category of driver assist information (Step 403).

The distributed driver assist information is stored in the recording medium, such as RAM. Here, the distributed drive assist information may be stored in the information recording medium 28.

Then, checking whether or not a next new event was already received (Step 404).

When the next new event has already been received, the operation is returned to Step 400. Then, the above described operations are performed on the next new event. When the next new event was not received, on the other hand, the selection of driver assist information is terminated.

Display Control of the Driver Assist Information

Figure 24:
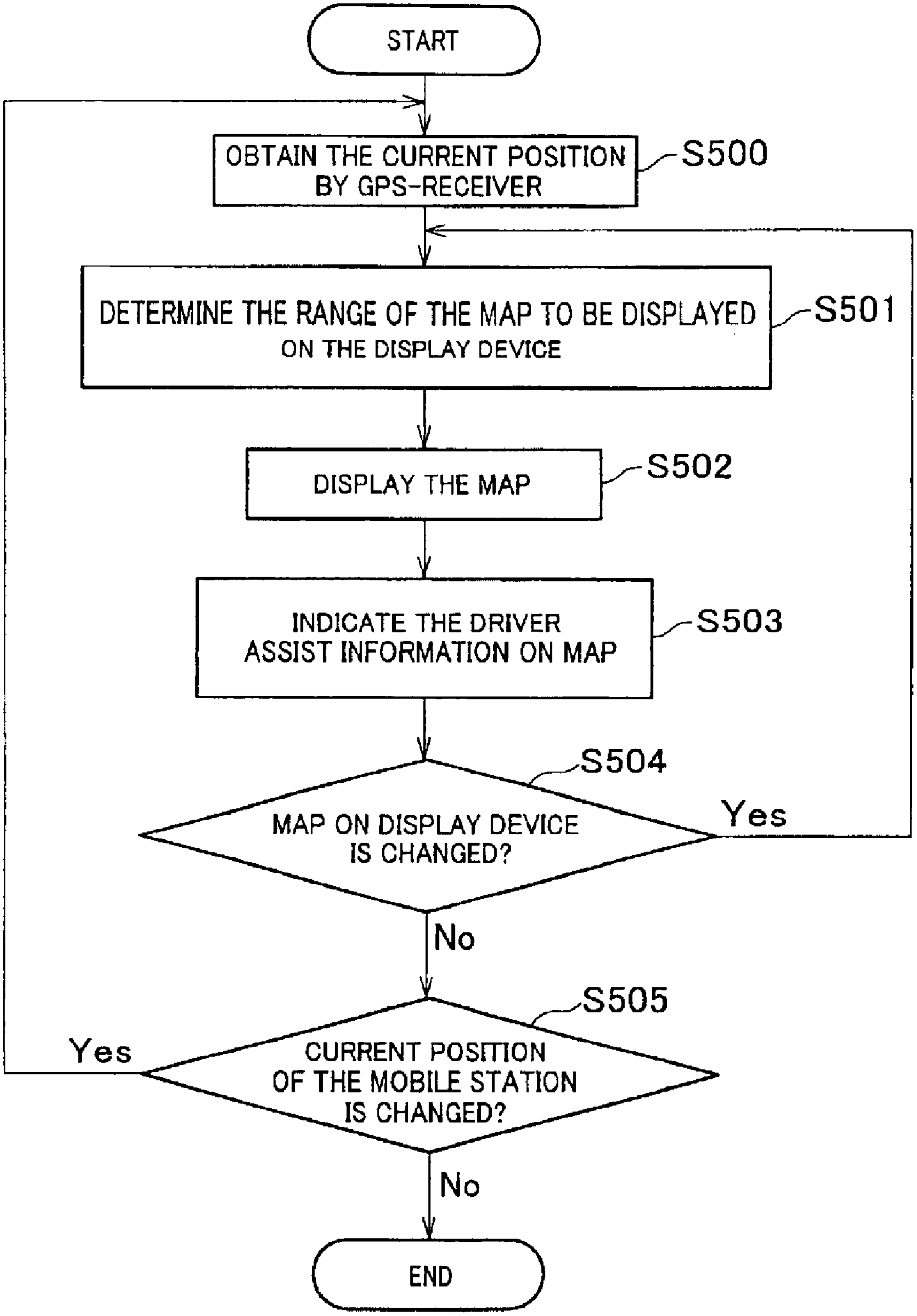
FIG. 24 is flow chart, which shows an example of the indication manner of driver assist information on the display device 24.

FIG. 24 is a flowchart explaining the display control motion of the display device 24 of the driver assist information receiver 3.

Before indicating driver assist information on the display device 24, the current position obtainer 22 of the driver assist information receiver 3 obtains the current position of the mobile station equipped with the driver assist information receiver 3 using the GPS-receiver 27 (Step 500).

Then, the range of the Map to be displayed on the display device 24 is determined by the Map range adjustor (Step 501).

On this occasion, when the range of the Map to be displayed on the display device 24 is previously established, the range of the Map to be displayed is determined according to the setting condition inputted by the occupant by means of the controller 25.

When the range of the Map to be displayed on the display device 24 is not previously established, the predetermined range of the Map, the center of which is the present position of the driver assist information receiver 3, is determined.

After determining the range of the Map, the readout of the Map data corresponding to the determined range from the information recording medium 28 is performed by the driver assist information arranger 23, then the Map is displayed on the display device 24 (Step 502).

On this occasion, the driver assist information associated with the displayed Map is selected from the driver assist information stored in the recording medium, such as RAM, which are installed in the driver assist information receiver 3. Then, the selected driver assist information is indicated on the Map displayed on the display device 24 (Step 503).

When the determined range of the Map is changed by the occupant of the mobile station, the motion is returned to Step 501, and the above described motions are again repeated (Step 504).

When the determined range of the Map is not changed, it is checked whether or not the mobile station equipped with the driver assist information receiver 3 is moving (Step 505).

When the mobile station is moving, the motion is returned to Step 500, and the above described motions are repeated again. On the contrary, if the mobile station is not moving, the motion of the display device is terminated (Step 505).

Display Control of the Driver Assist Information 2

Figure 25:
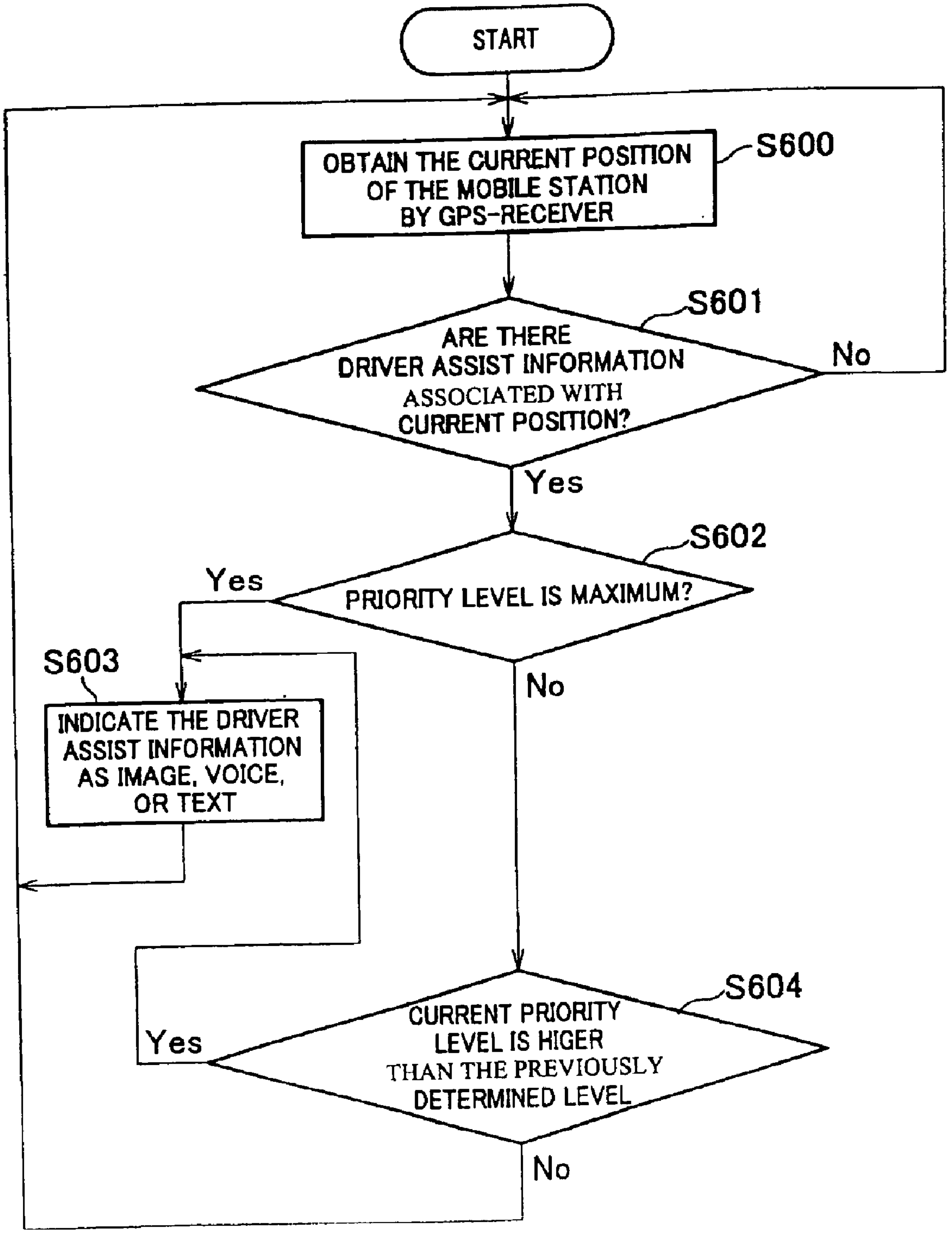
FIG. 25 is flow chart, which shows another example of the indication manner of driver assist information on the display device 24, wherein driver assist information to be indicated is selected based on the current position of the driver assist information receiver 3.

FIG. 25 is a flowchart explaining another display control motion of the display device 24 of the driver assist information receiver 3.

Before indicating driver assist information on the display device 24, the current position obtainer 22 of the driver assist information receiver 3 obtains the positional information, which indicates the current position of the mobile station equipped with the driver assist information receiver 3, using the GPS-receiver 27 (Step 600).

Then, based on the obtained positional information of the mobile station, it is checked whether or not there is the driver assist information associated with the obtained positional information by referring to the positional information of the driver assist information classified to each of the secondary mesh division (Step 601).

When there is no driver assist information associated with the positional information of the mobile station, the motion is returned to Step 600.

When there is driver assist information associated with the positional information of the mobile station, it is checked whether or not the priority level of driver assist information is maximum (Step 602).

When the priority level of driver assist information is maximum level, the content of this driver assist information is indicated on the display device 24 by text information or image information (Step 603).

In the present embodiment, when there is voice information of driver assist information, the voice message or the beep sounds are provided to the occupant through the speaker, etc.

When the priority level of driver assist information is not maximum level, the degree of the priority level is checked.

To be more precise, in the present embodiment, the priority level is indicated as Level 1, Level 2, Level 3, Level 4, and Level 5. Here, Level 5 indicates that the priority level is most high, Level 1 indicates that the priority level is minimum.

Therefore, the previously determined priority level is compared with the priority level of driver assist information (Step 604).

When the priority level is higher than the previously determined priority level of driver assist information, for example, when the priority level is Level 4 and the previously determined priority level is Level 3, driver assist information having Level 4 is indicated on the display device 24 as the text information, an image information, etc (Step 603).

When there is the voice information of driver assist information, the voice message or the beep sounds are provided to the occupant through the speaker, etc.

If the priority level of driver assist information is not higher than the previously determined priority level, the motion is returned to Step 600. Then, the above described motions are repeated again.

Display Control of the Driver Assist Information 3

Figure 26:
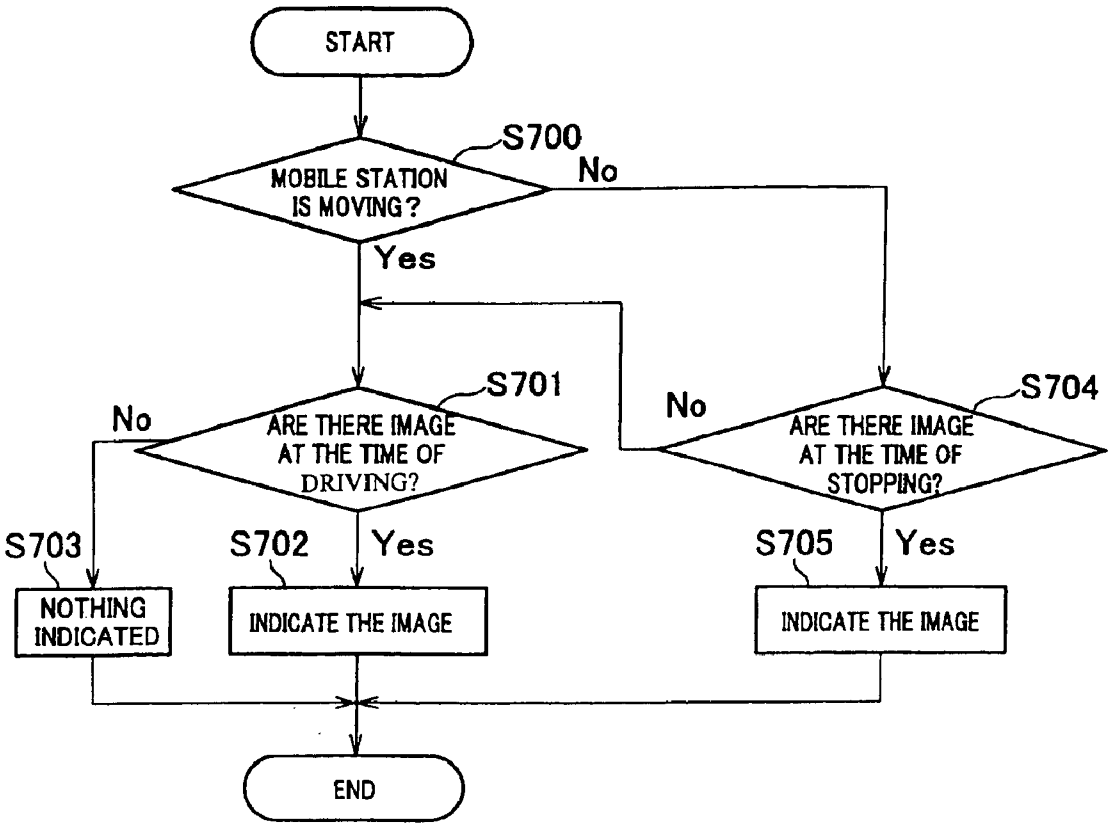
FIG. 26 is flow chart, which shows another example of the indication manner of driver assist information on the display device 24, wherein the mobile station is stopping or moving.

FIG. 26 is a flowchart explaining still another display control of the display device 24 of the driver assist information receiver 3.

Before indicating driver assist information on the display device 24, it is checked whether or not the mobile station is moving by the current position obtainer 22 using the GPS-receiver 27 (Step 700).

When the mobile station is moving, the driver assist information arranger 23 checks whether or not there is the driver assist information, which is indicated when the mobile station is moving (Step 701).

When there is the driver assist information, which is indicated when the mobile station is traveling, the corresponding driver assist information is indicated on the display device 24 (Step 702).

If there is no driver assist information, which is indicated when the mobile station is traveling, driver assist information is not indicated on the display device 24 (Step 703).

When it is judged that the mobile station is not moving, the driver assist information arranger 23 checks whether or not there is the driver assist information to be indicated on the display device 24 when the mobile station is not moving (Step 704).

When there is the driver assist information, which is indicated when the mobile station is not traveling, driver assist information is indicated on the display device 24 (Step 705). If there is no driver assist information to be displayed when the mobile station is not on the move, the operation is moved to Step 701.

Display Control of the Driver Assist Information 4

Figure 27:
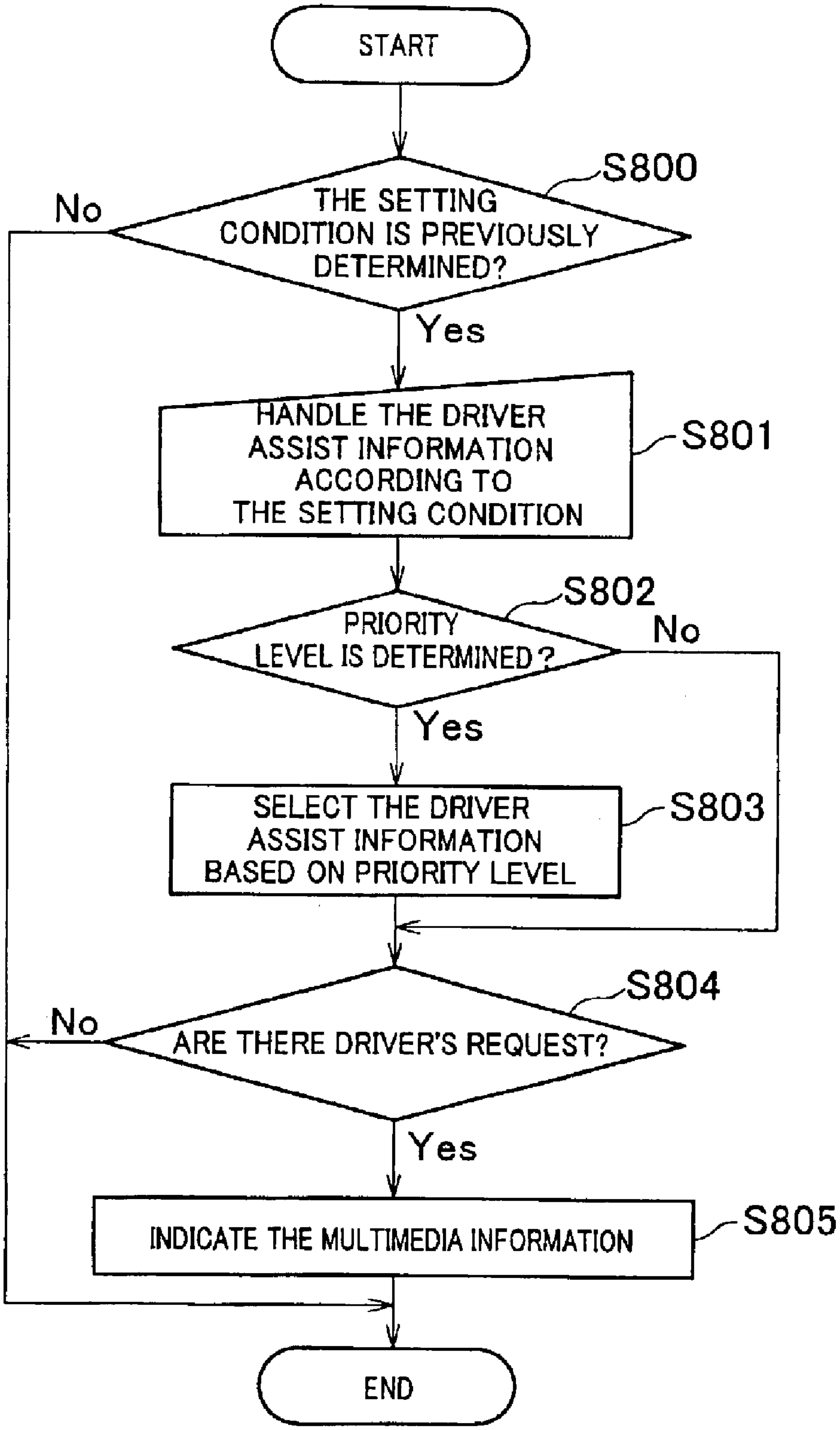
FIG. 27 is flow chart, which shows another example of the indication manner of driver assist information on the display device 24, wherein driver assist information is based on the setting condition determined by the occupant.

FIG. 27 is a flowchart explaining another display control of the display device 24 of the driver assist information receiver 3.

Before indicating driver assist information on the display device 24, it is checked whether or not the category type of driver assist information, which is indicated on the display device 24, has been previously determined by the occupant (Step 800).

When the category type of driver assist information has not been determined, the motion is terminated.

If the category type of the driver assist information has been previously determined, the operation is proceeded along the setting condition, which is determined by the occupant (Step 801).

For example, it is checked whether or not the priority level of driver assist information to be displayed has been determined (Step 802). Here, this check is preformed by a driver assist information selector. When the priority level is not yet determined, the motion is moved to Step 804.

When the priority level has not been established, the driver assist information is selected according to the determined level (Step 803).

Additionally, it is checked whether or not the occupant is requesting the driver assist information through the pushing of the icon on the Map, which is displayed on the display device 24 (Step 804).

When the occupant is requesting driver assist information through the pushing of the icon, the driver assist information related to the icon is selected.

Accordingly, the driver assist information, which agrees with the setting condition or the request by the occupant, is selected, and the selected driver assist information is indicated on the display device 24 (Step 805).

Although there have been described what are the preferred embodiments of the present invention, it will be understood that variations and modifications may be made thereto without departing from the spirit or essence of the invention.

What is claimed is:

1. A driver assist information transmitter, which assists an occupant of a mobile station comprising;

a driver assist information generator, which performs a readout of real time information and multimedia information to be added to said real time information as complementary information, and generates driver assist information to each element of said real time information, wherein said driver assist information is composed of said real time information, said multimedia information, and positional information, and wherein, said real time information is information to be updated at predetermined intervals, and said multimedia information includes at least one of image data, audio data, graphic data, and text data, and said positional information indicates the position of said element of said real time information;

a coded data compactor, which performs coding of said driver assist information using a specific description language in order to obtain coded driver assist information, and then performs the compaction of said coded driver assist information in order to obtain compacted coded driver assist information;

an event module constitutor, which generates a frame from an information part of said compacted coded driver assist information, and constitutes a module by classifying every frame based on said positional information, and then organizes an event, which is obtained by collecting all said modules, which are generated at the same time; and a transmitter, which performs a modulation of said event in order to obtain a modulated event, and broadcasts said modulated event repeatedly at a fixed cycle.

2. A driver assist information transmitter according to claim 1, wherein said coded data compactor describes said real time information, said multimedia information, and said positional information using the same description language.

3. A driver assist information transmitter according to claim 1, wherein said coded data compactor replaces identical words, which are described in said specific description language, among said coded driver assist information with the same unique compaction code, respectively, and compresses another part of said coded driver assist information into binary form.

4. A driver assist information transmitter according to claim 1, wherein said specific description language is XML language.

5. A driver assist information transmitter according to claim 1, wherein said event includes at least one of release version information, time of transmission information, expiration date information, cycle of update information, and priority information.

6. A driver assist information transmitter according to claim 1, wherein said transmitter broadcasts said modulated event using the terrestrial digital broadcasting technique.

7. A driver assist information receiver, which receives a modulated event to be broadcasted from said driver assist information transmitter of claim 1, and obtains said driver assist information included in said modulated event based on the current position of a mobile station, said driver assist information receiver comprising:

an event demodulator, which performs a demodulation of said modulated event in order to obtain said event, a driver assist information obtainer, which performs a decompression on each frame in said module of said event, and then performs a decoding in order to obtain said driver assist information;

a current position obtainer, which acquires positional information indicating the current position of said mobile station;

a driver assist information arranger, which selects driver assist information to be required by said mobile station among said driver assist information obtained in said driver assist information obtainer based on said positional information acquired by said current position obtainer;

a display device, which indicates said driver assist information selected by said driver assist information arranger on a map displayed thereon; and a controller, which inputs the setting condition of driver assist information in order to modify an indication manner of said map.

8. A driver assist information receiver according to claim 7, wherein said controller has a map range adjustor, which adjusts a map area to be displayed on said display device, and a driver assist information selector, which determines whether or not the driver assist information would be displayed on said display device.

9. A driver assist information providing system, which assists an occupant of a mobile station, said driver assist information providing system comprising:

a driver assist information transmitter; and a driver assist information receiver; wherein said driver assist information transmitter has a driver assist information generator, which performs a readout of real time information and multimedia information to be added to said real time information as complementary information, and generates driver assist information to each element of said real time information, and wherein said driver assist information, is composed of said real time information, said multimedia information, and positional information, and wherein, said real time information is information to be updated at predetermined intervals, and said multimedia information includes at least one of image data, audio data, graphic data, and text data, and said positional information indicates the position of said element of said real time information, a coded data compactor, which performs coding of said driver assist information using a specific description language in order to obtain coded driver assist information, and then performs the compaction of said coded driver assist information in order to obtain compacted coded driver assist information, an event module constitutor, which generates a frame from an information part of said compacted coded driver assist information, and constitutes a module by classifying every frame based on said positional information, and then organizes an event, which is obtained by collecting all said modules, which are generated at the same time, and a transmitter, which performs a modulation of said event in order to obtain a modulated event, and broadcasts said modulated event repeatedly at a fixed cycle; and wherein said driver assist information receiver receives a modulated event to be broadcasted from said driver assist information transmitter, and obtains said driver assist information included in said modulated event based on the current position of a mobile station, said driver assist information receiver has an event demodulator, which performs a demodulation of said modulated event in order to obtain said event, a driver assist information obtainer, which performs a decompression on each frame in said module of said event, and then performs a decoding in order to obtain the driver assist information;

a current position obtainer, which acquires positional information indicating the current position of said mobile station;

a driver assist information arranger, which selects driver assist information to be required by said mobile station among driver assist information obtained in said driver assist information obtainer based on said positional information acquired by said current position obtainer;

a display device, which indicates said driver assist information selected by said driver assist information arranger on a map displayed thereon; and a controller, which inputs the setting condition of driver assist information in order to modify an indication manner of said map.

* * * * *

UNITED STATES PATENT AND TRADEMARK OFFICE

CERTIFICATE OF CORRECTION

PATENT NO. : 6,873,904 B2 
APPLICATION NO. : 10/413,069
DATED : March 29, 2005
INVENTOR(S) : Tetsuo Yamamoto, Akira Yamada, Yasuhiro Nishigori It is certified that error appears in the above-identified patent and that said Letters Patent is hereby corrected as shown below:

Drawings:

Sheet 4 of 22, Fig. 4, change "POSSITIONAL" to --POSITIONAL--; change "COODINATE" to --COORDINATE--;

Fig. 5, change "POSSITIONAL" to --POSITIONAL--; change "COODINATE" to --COORDINATE--.

Sheet 5 of 22, Fig. 6, change "CONGENSTION" to --CONGESTION--.

Sheet 6 of 22, Fig. 7, change "COODINATE" to --COORDINATE--.

Sheet 7 of 22, Fig. 8, change "SYBMOL" to --SYMBOL--.

Sheet 9 of 22, Fig. 11, change "GRAOHIC" to --GRAPHIC--.

Sheet 10 of 22, Fig. 13A, change "INFORMATON" to --INFORMATION--.

Sheet 11 of 22, Fig. 14, change "INORMATION" to --INFORMATION--.

Sheet 12 of 22, Fig. 16, change "CONGESSTION" to --CONGESTION--.

Sheet 13 of 22, Fig. 17, change "REGURATION" to --REGULATION-- (both occurrences).

Sheet 20 of 22, Fig. 25, change "ARE THERE" to --IS THERE--; change HIGER" to --HIGHER--.

Sheet 21 of 22, Fig. 26, change "ARE THERE" to --IS THERE-- (both occurrences).

Sheet 22 of 22, Fig. 27, change "ARE THERE" to --IS THERE--.

Column 1:

Line 20, change "One is the technique, " to --One is the technique-- (delete the comma after "technique").

Line 23, change "technique, in which" to --technique in which--.

Column 2:

Line 19, change "congestion information, multimedia" to --congestion information; multimedia--.

Line 22, change "(information), and positional" to --(information); and positional--.

Column 3:

Line 7, change "arranger on the Map," to --arranger on the map,--.

Line 11, change "manner of the Map." to --manner of the map.--.

UNITED STATES PATENT AND TRADEMARK OFFICE
CERTIFICATE OF CORRECTION

PATENT NO. : 6,873,904 B2
APPLICATION NO. : 10/413,069
DATED : March 29, 2005
INVENTOR(S) : Tetsuo Yamamoto, Akira Yamada, Yasuhiro Nishigori It is certified that error appears in the above-identified patent and that said Letters Patent is hereby corrected as shown below:

Column 4:
Line 36, change "FIG. 22 is flow chart" to --FIG. 22 is a flow chart--.
Line 39, change "FIG. 23 is flow chart" to --FIG. 23 is a flow chart--.
Line 42, change "FIG. 24 is flow chart" to --FIG. 24 is a flow chart--.
Line 45, change "FIG. 25 is flow chart" to --FIG. 25 is a flow chart--.
Line 50, change "FIG. 26 is flow chart" to --FIG. 26 is a flow chart--.
Line 53, change "FIG. 27 is flow chart" to --FIG. 27 is a flow chart--.
Line 64, change "apparatus, which generates" to --apparatus which generates--.

Column 5:
Line 8, change "the apparatus, which" to --the aparatus which--.
Line 37, change "Next, The driver" to --Next, the driver--.

Column 6:
Line 38, change "one of elements" to --one of the elements--.
Line 50, change "information, tour-" to --information, and tour- --.

Column 10:
Line 3, change "arrive at end" to --arrive at the end--.
Line 4, change "such as gas" to --such as a gas--.
Line 5, change "which are used" to --which is used--.
Line 11, change "which are indicated on the Map" to --which is indicated on the map--.
Line 41, change "the sight spot" to --the site spot--.
Line 46, change "and sight spot" to --and site spot--.
Line 49, change "the sight spot" to --the site spot--.
Line 50, change "relevant to the sight" to --relevant to the site--.

Column 11:
Line 18, change "is used as tag name" to --is used as the tag name--.

Column 12:
Line 9, change " "10:55 is an" to -- "10:55" is an --.
Line 12, change "if this another" to --if this other--.
Line 22, change "voice information, graphic" to --voice information, and graphic--.

Column 13
Line 50, change "each of compacted" to --each of the compacted--.

UNITED STATES PATENT AND TRADEMARK OFFICE

CERTIFICATE OF CORRECTION

PATENT NO. : 6,873,904 B2

APPLICATION NO. : 10/413,069
DATED : March 29, 2005
INVENTOR(S) : Tetsuo Yamamoto, Akira Yamada, Yasuhiro Nishigori It is certified that error appears in the above-identified patent and that said Letters Patent is hereby corrected as shown below:

Column 14:
Line 15, change "Map, which corresponds" to --map, which corresponds--.
Line 21, change "on the Map of" to --on the map of--.
Line 48, change "as the number of area" to --as the number of the area--.
Line 63, change "performed at interval" to --performed at intervals--.
Line 64, change "times at interval" to --times at intervals--.

Column 15:
Line 1, change "at short interval" to --at short intervals--.
Line 3, change "at short interval" to --at short intervals--.
Line 4, change "information are not" to --information is not--.
Line 10, change "at short interval" to --at short intervals--.
Line 50, change "represent the weather" to --represents the weather--.
Line 66, change "being associating with" to --being associated with--.

Column 16:
Line 48, change "constitutor 6 collect" to --constitutor 6 collects--.
Line 51, change "module (Step 104" to --modules (Step 104--.

Column 18:
Line 12, change "Map information" to --map information--.
Line 17, change "Map information" to --map information--.
Line 54, change "traffic congestion forehead" to --traffic congestion ahead--.
Line 59, change "Parking capacity information, Name" to --parking capacity information name--.
Line 60, change "Sales information" to --sales information--.
_Line 62, change "on the Map" to --on the map--.

Column 19:
Line 9, delete "trans-".
Line 10, change "mitter 3" to --receiver 3--.
Line 12, change "transmitter 3" to --receiver 3--.
Line 47, change "Map information" to --map information--.
Line 51, change "Map information" to --map information--.
Line 56, change "on the Map" to --on the map--.
Line 60, change "information are" to --information is--.
Line 63, change "transition technique" to --transmission technique--.

UNITED STATES PATENT AND TRADEMARK OFFICE

CERTIFICATE OF CORRECTION

PATENT NO. : 6,873,904 B2 
APPLICATION NO. : 10/413,069
DATED : March 29, 2005
INVENTOR(S) : Tetsuo Yamamoto, Akira Yamada, Yasuhiro Nishigori It is certified that error appears in the above-identified patent and that said Letters Patent is hereby corrected as shown below:

Column 20:
Line 6, change "display of Map" to --display of the map--.
Line 10, change "For example, the Map" to --For example, the map--.
Line 12, change "recent year" to --recent years--.
Line 15, change "the Map data" to --the map data--.
Line 15, change "the Map data" to --the map data--.
Line 20, change "up-to-date Map data" to --up-to-date map data--.
Line 41, change "Another identification methods." to --Another identification method.--.

Column 21:
Line 7, change "drive assist information" to --driver assist information--.
Line 65, change "of the Map" to --of the map--.
Line 66, change "by the Map" to --by the map--.

Column 22:
Line 1, change "range of the Map" to --range of the map--.
Line 3, change "range of the Map" to --range of the map--.
Line 6, change "range of the Map" to --range of the map--.
_ Line 8, change "range of the Map" to --range of the map--.
Line 10, change "range of the Map" to --range of the map--.
Line 11, change "Map data" to --map data--.
Line 13, change "then the Map" to --then the map--.
Line 16, change "the displayed Map" to --the displayed map--.
Line 18, change "which are installed" to --which is installed--.
Line 20, change "the Map displayed" to --the map displayed--.
Line 21, change "range of the Map" to --range of the map--.
Line 25, change "range of the Map" to --range of the map--.

UNITED STATES PATENT AND TRADEMARK OFFICE

CERTIFICATE OF CORRECTION

PATENT NO. : 6,873,904 B2
APPLICATION NO. : 10/413,069
DATED : March 29, 2005
INVENTOR(S) : Tetsuo Yamamoto, Akira Yamada, Yasuhiro Nishigori It is certified that error appears in the above-identified patent and that said Letters Patent is hereby corrected as shown below:

Column 24:
Line 7, change "check is preformed" to --check is performed--.
Line 15, change "on the Map" to --on the map--.

Column 26:
Line 8, change "information; is composed" to --information is composed--.

Signed and Sealed this

Fifteenth Day of August, 2006

JON W. DUDAS
*Director of the United States Patent and Trademark Office*